US011578213B2

(12) United States Patent
Miller

(10) Patent No.: US 11,578,213 B2
(45) **Date of Patent: *Feb. 14, 2023**

(54) ELECTROTHERMIC COMPOSITIONS

(71) Applicant: INTELLI PARTICLE PTY LTD, Potts Point (AU)

(72) Inventor: Cole Miller, Potts Point (AU)

(73) Assignee: INTELLI PARTICLE PTY LTD, Marrickville (AU)

( * ) Notice: Subject to any disclaimer, the term of this patent is extended or adjusted under 35 U.S.C. 154(b) by 776 days.

This patent is subject to a terminal disclaimer.

(21) Appl. No.: 16/542,841

(22) Filed: Aug. 16, 2019

(65) Prior Publication Data

US 2019/0382588 A1 Dec. 19, 2019

Related U.S. Application Data

(63) Continuation-in-part of application No. 15/038,343, filed as application No. PCT/AU2014/000670 on Jun. 26, 2013, now Pat. No. 10,433,371.

(30) Foreign Application Priority Data

Jun. 26, 2013 (AU) ................................ 2013902348

(51) Int. Cl.
*H05B 3/14* (2006.01)
*C09C 1/46* (2006.01)
(Continued)

(52) U.S. Cl.
CPC .................. *C09C 1/46* (2013.01); *C09C 1/50* (2013.01); *C09C 1/52* (2013.01); *H05B 3/145* (2013.01);
(Continued)

(58) Field of Classification Search
CPC .................................. H01B 1/24; H05B 3/145
See application file for complete search history.

(56) References Cited

U.S. PATENT DOCUMENTS

| | | | |
|---|---|---|---|
| 3,342,627 | A | 9/1967 | Paxton |
| 3,923,697 | A | 12/1975 | Ellis |

(Continued)

FOREIGN PATENT DOCUMENTS

| | | |
|---|---|---|
| CN | 101462889 | 6/2009 |
| DE | 1 953 003 | 6/1971 |

(Continued)

OTHER PUBLICATIONS

International Search Report dated Aug. 8, 2014 in International (PCT) Application No. PCT/AU2014/000670.

(Continued)

*Primary Examiner* — Helena Kosanovic
*Assistant Examiner* — Lawrence H Samuels
(74) *Attorney, Agent, or Firm* — Wenderoth, Lind & Ponack, L.L.P.

(57) ABSTRACT

According to the invention there is provided an electrothermic composition comprising: a carbon component; a graphite component having a crystallinity of 99.9% and wherein the graphite is heat treated at a temperature of 2500° C. to 3000° C., and a binder, whereby the composition has a thermal coefficient of electrical resistance (TCR) of ±0.0001 to 0.0010 per ° C. over a temperature range of from about 20° C. to 60° C. in an airborne environment, wherein the ratio of the first conductive component and the second resistor component is selected between 10:1 to 1:10.

20 Claims, 5 Drawing Sheets

(51) Int. Cl.
*C09C 1/50* (2006.01)
*C09C 1/52* (2006.01)

(52) U.S. Cl.
CPC .. *H05B 2203/016* (2013.01); *H05B 2203/026* (2013.01)

(56) References Cited

U.S. PATENT DOCUMENTS

| | | | | | |
|---|---|---|---|---|---|
| 4,064,074 | A * | 12/1977 | Ellis | H05B 3/145 | 252/502 |
| 4,401,590 | A | 8/1983 | Yoshimma | | |
| 4,518,851 | A | 5/1985 | Oppitz | | |
| 4,547,310 | A | 10/1985 | Kasanami et al. | | |
| 4,645,913 | A | 2/1987 | Oppitz | | |
| 4,783,587 | A | 11/1988 | Ishii | | |
| 4,800,253 | A | 1/1989 | Kleiner | | |
| 4,877,554 | A * | 10/1989 | Honma | H01C 17/0652 | 524/495 |
| 5,549,849 | A | 8/1996 | Namura et al. | | |
| 6,063,463 | A | 5/2000 | Schlueter, Jr. et al. | | |
| 6,086,791 | A * | 7/2000 | Miller | H01B 1/24 | 252/511 |
| 6,818,156 | B1 * | 11/2004 | Miller | H01B 1/24 | 252/511 |
| 8,466,392 | B2 | 6/2013 | O'Connor | | |
| 2007/0029307 | A1 * | 2/2007 | Erickson | H05B 3/145 | 219/543 |
| 2008/0251510 | A1 | 10/2008 | Park | | |
| 2009/0184108 | A1 | 7/2009 | O'Connor | | |
| 2009/0206067 | A1 | 8/2009 | Foss | | |
| 2010/0090171 | A1 | 4/2010 | Lee et al. | | |
| 2017/0238368 | A1 | 8/2017 | Shangin | | |

FOREIGN PATENT DOCUMENTS

| | | |
|---|---|---|
| JP | 2012-28225 | 2/2012 |
| WO | 2005/036562 | 4/2005 |

OTHER PUBLICATIONS

Extended European Search Report dated Jul. 18, 2017 in European Application No. 14817970.8.

Office Action dated Jun. 26, 2018 in corresponding European application No. 14 817 970.8.

* cited by examiner

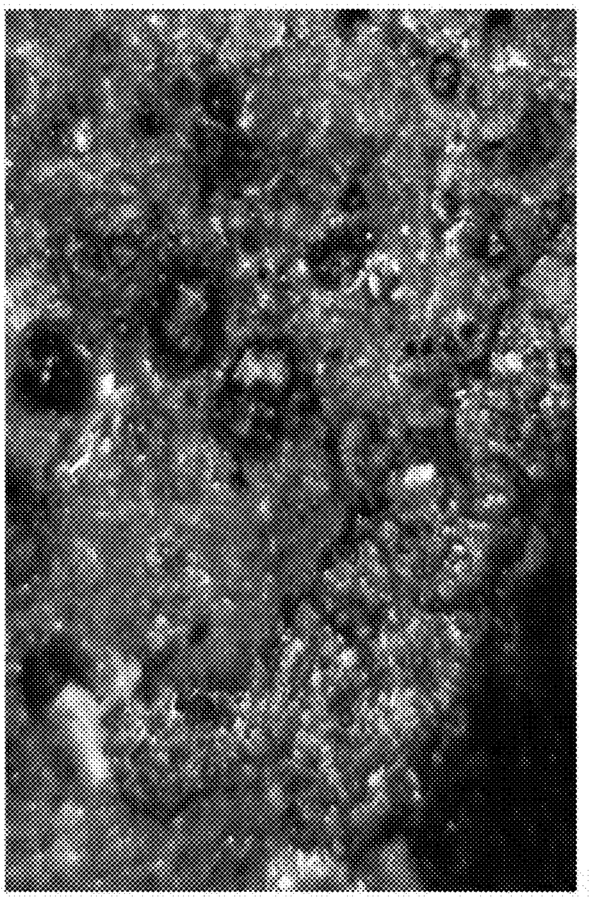
Fig. 1b
Fig. 1a
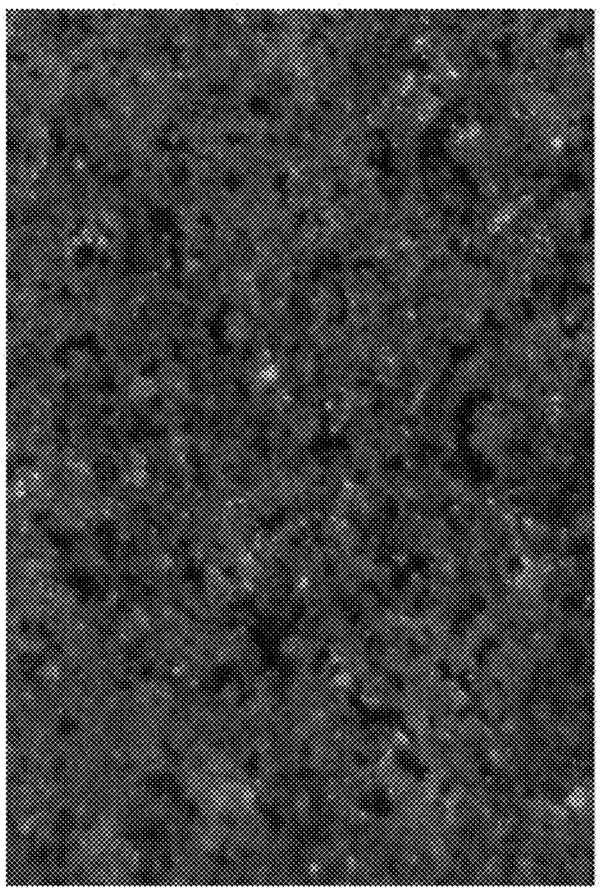

ELECTROTHERMIC COMPOSITIONS

FIELD OF THE INVENTION

The present invention relates to electrically conductive materials comprising non-metallic conducting components which are useful in, for example, coating applications. However, it will be appreciated that the invention is not limited to this particular field of use. More particularly, the invention relates to compositions or materials formed from the compositions that display electrothermic properties, whereby the composition or material generates heat when an electrical potential is applied across the composition/material.

BACKGROUND OF THE INVENTION

Electrically conductive compositions and coatings are well known in the art. Processes for forming such compositions, and details of general applications of same are described, for example, in U.S. Pat. No. 3,099,587, wherein electrically conductive coatings comprising a mixture of C, Ag, and Fe in a thermosetting resin are applied to non-conductive surfaces. Due to the expense of precious metals, large scale commercial use of these coatings is unattractive.

In another example, electrothermic coatings are described in British Patent No. 1,286,855 and comprise aqueous mixtures of graphite and conductive carbon black in potassium silicate and lithium silicate-sodium solutions along with appropriate wetting agents. However, the coatings require use of large expensive transformers for voltage control when the coatings are used as paint for radiant heating in homes. Thus installation costs for such applications are prohibitively high.

U.S. Pat. No. 5,545,679 describes positive temperature coefficient conductive polymers made form thermosetting polyester resins and conductive fillers. The conductive fillers are chosen from carbon and/or graphite. These compositions are useful in current limiting devices. For example, when the current increases due to short circuit or overload, the composition temperature increases and changes to a high resistance state which limits the current to a safe value until the power is removed. When the power is removed, the material returns to its original low resistance state, and is therefore a resettable fuse or current limiter device.

U.S. Pat. No. 6,086,791 describes electrically conductive electrothermic paints that resist breakdown for several months, while outputting relatively constant heat when alternating current (AC) is applied. The coating compositions comprise a heat resistant binder, conductive carbon, non-conductive flake-like carbon black pigment particles and conductive flake-like graphite pigment particles of particle sizes of from about 5 to 500 microns.

U.S. Pat. No. 6,818,156 describes the preparation of heat emitting coating compositions. These coating compositions comprise curable binders, and electrically conductive carbon black particles generated by high temperature pyrolysis of acetylene at around 4427° C. (8000° F.) (Ketjenblacks) and which have particle sizes between about 0.001 and 500 microns. The document teaches at column 2, that use of the acetylene-based carbon black particles alone will not result in a stable coating system. That is, the coating will continue to heat until it burns out (i.e., breaks down). An electrically conductive graphite particle having similar particle size to the carbon black is also used. The document also teaches that use of graphite with a lesser electrical conductivity is preferred, and that crystallinity of greater than about 67% Is also preferred.

In addition to the above-mentioned general problems associated with prior art coatings, performance issues make large scale commercial use not practical. For example, heat output can be difficult to control, and prior art electrothermic coatings or paints can show great variation in their day-to-day electrical conductivity and heat generation.

It would be desirable to provide alternative electrothermic compositions that are highly conductive, self regulating, do not "run away", do not deteriorate over long periods of time, and can be formed into useful products, such as surface coatings or even 3D shapes.

Any discussion of the prior art throughout the specification should in no way be considered as an admission that such prior art is widely known or forms part of common general knowledge in the field.

It is an object of the present invention to overcome or ameliorate at least one of the disadvantages of the prior art, or to provide a useful alternative.

SUMMARY OF THE INVENTION

According to a first aspect of the present invention, there is provided an electrothermic composition comprising:

- a first conductive carbon component selected from the group consisting of: conventional thermal blacks, furnace blacks, lamp blacks, channel blacks, surface-modified carbon blacks, surface functionalised carbon blacks, and heat-treated carbons;
- a second resistor component which is graphite having a crystallinity of 99.9% and wherein the graphite is heat treated at a temperature of 2500° C. to 3000° C.; and a binder;
- whereby the composition has a thermal coefficient of electrical resistance (TCR) of ±0.0001 to 0.0010 per ° C. over a temperature range of from about 20° C. to 60° C. in an airborne environment,
- wherein the ratio of the first conductive component and the second resistor component is selected between 10:1 to 1:10.

According to one embodiment of the first aspect of the present invention, there is provided an electrothermic composition consisting of:

- a first conductive carbon component selected from the group consisting of conventional thermal blacks, furnace blacks, lamp blacks, channel blacks, surface-modified carbon blacks, surface functionalised carbon blacks, and heat-treated carbons;
- a second resistor component which is graphite having a crystallinity of 99.9% and wherein the graphite is heat treated at a temperature of 2500° C. to 3000° C.;
- a binder; and
- optionally, a solvent or diluent;
- whereby the composition has a thermal coefficient of electrical resistance (TCR) of ±0.0001 to 0.0010 per ° C. over a temperature range of from about 20° C. to 60° C. in an airborne environment,
- wherein the ratio of the first conductive component and the second resistor component is selected between 10:1 to 1:10.

According to another embodiment of the first aspect of the present invention, there is provided an electrothermic composition consisting of:

- a first conductive carbon component selected from the group consisting of: conventional thermal blacks, furnace blacks, lamp blacks, channel blacks, surface-modified carbon blacks, surface functionalised carbon blacks, and heat-treated carbons;

a second resistor component which is graphite having a crystallinity of 99.9% and wherein the graphite is heat treated at a temperature of 2500° C. to 3000° C.; and a binder;

whereby the composition has a thermal coefficient of electrical resistance (TCR) of ±0.0001 to 0.0010 per ° C. over a temperature range of from about 20° C. to 60° C. in an airborne environment, wherein the ratio of the first conductive component and the second resistor component is selected between 10:1 to 1:10.

According to a second aspect of the present invention, there is provided a method for generating heat on a floor, wall, or ceiling, the method comprising the steps of:

(a) providing a composition according to the first aspect above;

(b) attaching electrodes to said composition or a material formed from the composition;

(c) connecting said electrodes to a source of electricity; and (d) energizing said source of electricity, thereby generating heat at a temperature of between 10 and 60° C. from said composition or a material formed from the composition.

As disclosed herein there is provided an electrothermic composition comprising:

at least one carbon component;

at least one graphite component; and an optional binder or carrier;

wherein the carbon, graphite, and/or their ratio are selected such that that the composition or a material formed from the composition has a thermal coefficient of electrical resistance (TCR) of about zero or is substantially stable over a predefined/predetermined temperature range.

As disclosed herein, the present invention provides a product produced by the electrothermic composition as described herein, or a material formed from the composition.

Electrical resistivity (also known as resistivity, specific electrical resistance, or volume resistivity) is an intrinsic property that quantifies how strongly a given material opposes the flow of electric current. Resistivity is usually temperature dependent, and the relationship is known as the thermal coefficient of electrical resistance (TCR) (also known as temperature coefficient of resistivity and resistance temperature coefficient). In some preferred embodiments of the invention, the TCR is zero, and in others the TCR is substantially stable, meaning that the thermal coefficient of electrical resistance is +/−0.00010 to 0.0015 per ° C., or +/−0.0001 to 0.0010 per ° C., or +/−0.0001 to 0.0008 per ° C., or +/−0.0001 to 0.0005 per ° C. or +/−0.0015 to 0.003 per ° C., or +/−0.003 to 0.03 per ° C., over a predefined/predetermined temperature range. By way of comparison, many commonly used materials have a TCR which can be many orders of magnitude larger than the compositions of the invention, e.g. Ag, Cu, Au, Al, W, Fe, Pt, Pb have TCR values are around 0.003 to 0.007 per ° C. Some materials have a negative TCR, such as silicon.

The inventive compositions described herein have a resistance which varies less than +/−5% over the predetermined temperature range. In other examples, the resistance varies less than +/−10, 9, 8, 7, 6, 5, 4, 3, 2, 1, 0.5, 0.4, 0.3, 0.2, 0.1 or 0.01%.

According to a further aspect, the present invention provides a method for controlling the thermal coefficient of electrical resistance (TCR) of a material, the method comprising the steps of:

providing a composition comprising at least one carbon component with at least one graphite component, wherein the carbon, graphite, and/or their ratio are selected such that that a material formed from the composition has a thermal coefficient of electrical resistance (TCR) of about zero or is substantially stable over a predefined temperature range.

The method further comprises the steps of adjusting the relative concentration of the carbon and graphite, and/or their ratio in the resultant composition such that that the composition or a material formed from the composition has a TCR of about zero or is substantially stable over said predefined temperature range and such that the composition or a material formed from the composition does not substantially degrade when subjected to a electrical potential.

According to a further aspect, the present invention provides a method for determining whether carbon and/or graphite particles are suitable for use in an electrothermic composition having a TCR of about zero or being substantially stable over a predefined temperature range, the method comprising the steps of:

preparing an electrothermic composition comprising: at least one carbon component: at least one graphite component and an optional carrier or binder;

determining the thermal coefficient of electrical resistance (TCR) of the composition or a material formed from the composition; and adjusting the concentration of and/or selecting the type of carbon and/or graphite, and/or their ratio in the resultant composition such that that the composition or a material formed from the composition has a TCR of about zero or is substantially stable over said predefined temperature range.

Preferably the composition or a material formed from the composition does not substantially break down or thermally degrade when subjected to a electrical potential.

In the embodiments above, the invention enables a material to be formulated such that it has a TCR of about zero or is substantially stable over a predefined/predetermined temperature range. Accordingly, the invention enables materials to be formulated which are tailored to have specific TCR properties for specific temperature ranges at which the material is designed or intended to operate at.

Advantageously, in certain embodiments the present invention avoids the use of an electrically conductive carrier or binder, and as such is an advance over the prior art which utilises electrically conductive carriers or binders in conjunction with electrically conductive additives. For the purposes herein, it should be understood that a "carrier" is a vehicle that is not "curable" into a coherent solid (e.g. clay, alumina, sand), whereas a "binder" is understood to be a vehicle that is curable into a solid (e.g. monomer/polymer) or can be melted into a solid (e.g. a glaze).

According to a further aspect, the present invention provides a method for generating heat, the method comprising the steps of:

(a) providing a composition or a material formed from the composition, wherein the composition comprises: an optional carrier or binder at least one carbon component; and at least one graphite component;

(b) attaching electrodes to said composition or a material formed from the composition;

(c) connecting said electrodes to a source of electricity; and (d) energizing said source of electricity, thereby generating heat from said composition or a material formed from the composition, wherein the carbon, graphite, and/or their ratio are selected such that that the composition or a material formed from the composition has a thermal coefficient of electrical resistance (TCR) of about zero or is substantially stable over a predefined temperature range In relation to the further aspect above, preferably at an applied voltage and current, the heat generated from the composition or a material formed from the composition is substantially constant over a predetermined time period. The applied voltage may be any suitable voltage, e.g., the voltage may be less than 240 V, or less than 120 V, or less than 100 V, or less than 60 V, or less than 50 V, or less than 20 V, or may be between 10 and 120 V, or may be between 50 and 240 V, or may be between 5 and 12 V, or may be between 2 and 24 V. or may be between 6 and 12 V, or may be between 6 and 24 V, or may be between 24 and 60 V, or may be between 50 and 100 V, or may be between 100 and 200 V, e.g., the applied voltage may be 2, 5, 8, 10, 12, 16, 18, 20, 24, 30, 35, 40, 45, 50, 55, 60, 65, 70, 75, 80, 100, 120, 140, 160, 180, 200, 220 or 240 V. The electricity source may be DC electricity. In this embodiment, it will be appreciated that the carbon, graphite, and their ratio in the resultant composition are selected such that that the composition or a material formed from the composition has a thermal coefficient of electrical resistance (TCR) of about zero or is substantially stable over a predefined temperature range.

The predetermined time period can be selected from weeks, months and years. Preferably the predetermined time is greater than 8, 9, 10, 15, 20, 25, 30, 35, 40, 45, or 50 weeks. In other embodiments the predetermined time is up to 3, 4, 5, 6, 7, 8, 9, 10, 11 or 12 months, or can be up to 1, 2, 3, 4, 5, or 10 years.

The predefined/predetermined temperature range can be any range, for example 10 to 40° C., 20 to 60° C., 10 to 60° C., 30 to 60° C., 30 to 80° C., 50 to 100° C., 60 to 150° C., 10 to 150° C., 20 to 120° C., 20 to 30° C., 20 to 50° C., 30 to 70° C., 150 to 200° C., 200 to 250° C., 250 to 300° C., 300 to 400° C., 400 to 500° C., 500 to 600° C., 600 to 700° C., 700 to 800° C., 800 to 900° C., 900 to 1000° C., 1000 to 1200° C. or any range in between. The electrical current can be DC or AC.

The inventor has surprisingly found that compositions of the invention can sustainably generate heat at elevated temperatures for extended periods of time without substantially degrading, i.e. creating fume, burning, causing uneven heating, thermal runaway or burn out, etc. Further, compositions of the invention have surprisingly high electrical impendence properties, high electrical cycle degradation resistance, and high resistance to moisture and the environment. In some preferred embodiments electrical current should not increase by more than 1, 2, 3, 4, 5, 6, 7, 8, 9, 10% or 15% over the entire life of the particular particles where electrical or other energy is imposed on carbon carbon/carbon or carbon/graphite mixtures. It has been surprisingly found that the heat potential from that electric energy consumed is generated, and stays substantially stable for long periods of time, preferably months or years. Generally any increase in electrical current (amps) is due to the vehicle in which the particles are initially employed, as this vehicle tends to dry out after excessive heating for long periods.

According to a further aspect of the invention, there is provided a method of preparing an electrothermic composition comprising the steps of:

(i) selecting a predetermined ratio of at least one carbon component and at least one graphite component such that the composition is electrically conductive, electrothermic and will have a thermal coefficient of electrical resistance of about zero or is substantially stable over a predefined temperature range; and (ii) preparing the composition by mixing said at least one carbon component and said at least one graphite component, optionally in a suitable binder or carrier.

In a further aspect of the invention, there is provided a method of preparing an electrothermic material comprising the steps of:

combining a composition of the invention with a carrier and applying the resultant mixture to a substrate to form a coating, film or layer thereon; or combining a composition of the invention with a curable binder and applying the resultant mixture to a substrate to form a coating, film or layer thereon and applying suitable curing conditions to substantially cure said binder.

In some preferred embodiments, the present invention provides compositions and processes for making a solid composition or a surface coating from either water-based or solvent-based formulations of carbon and graphite dispersed in a curable binder. Preferably the binder is chosen such that it is a high temperature resistant binder. The components of the composition are chosen such that the composition displays TCR of zero. The compositions of the invention are an advance over the prior art as smaller particle sizes of carbon and graphite are employed in relatively larger quantities in the binder to provide more conductive/less resistive materials. The materials of the invention address the stability and reproducibility issues of prior art materials to produce electrically conductive products that can be used to make heating elements of all shapes and sizes. Without wishing to be bound by any theory, it is believed that the stabilizing carbon particle counteracts the negative thermal coefficient of resistance of the graphite, so that the resulting formulation has zero TCR or is substantially stable over a predefined temperature range. The compositions of the invention are stable in that they show substantially no increase or decrease in resistance with changes of temperature, and therefore have a TCR of about zero. Moreover, the overall resistance in ohms per square cm of the compositions of the invention are invariant with temperature changes, with varying voltage, or changes over time. Coating compositions, thus, show no "start-up" amperage or current surges. In addition, they have been shown to be conductively stable with time. In some embodiments, the resistance in ohms of the composition, e.g., across a predetermined width of the composition or a material formed from the composition, may be less than 400Ω, or less than 350Ω, or less than 300Ω, or less than 250Ω, or less than 200Ω, or less than 150Ω, or less than 100Ω, or less than 50Ω, or less than 25Ω, or less than 10Ω, or less than 5Ω, or less than 1Ω, e.g., may be between 1 and 50Ω, or between 10 and 100Ω, or between 1 and 100Ω, or between 20 and 250Ω, or between 1 and 250Ω, or between 1 and 350Ω, or between 1 and 400Ω, or between 10 and 150Ω, or between 5 and 300Ω, or between 5 and 50Ω, or between 50 and 350Ω, or between 10 and 250Ω, or between 100 and 400Ω, e.g., may be 1, 5, 10, 20, 30, 40, 50, 60, 70, 80, 90, 100, 120, 140, 160, 180, 200, 250, 300, 350, or 400Ω. The predetermined width may be 1 cm, 2 cm, 10 cm, 20 cm, 50 cm, 100 cm, 1.5 m, 2 m, 5 m, 10 m or may be between 1 and 50 cm, or between 10 and 100 cm, or between 50 and 150 cm, or between 1 cm and 2 m, or between 100 cm and 250 cm, or may be 1, 2, 5, 10, 20, 40, 60, 80, 100, 150, 200, 500, or 1000 cm.

As the skilled person will appreciate, and as discussed above, the specific resistance of a material may change with temperature. For example, for pure metals, the temperature coefficient of resistance is positive, meaning that resistance increases with increasing temperature. For the elements silicon, and germanium, this coefficient is a negative number, meaning that resistance decreases with increasing temperature. The applicant considers that it is advantageous to formulate electrothermic compositions with a TCR of zero, meaning that the resistance hardly changes at all with variations in temperature, or at the very least in a predefined temperature range, as such compositions show, for example, electrical stability over extended time periods and tend to avoid thermal "run away".

The dry powder compositions, surface coatings and/or other materials formed from the compositions of the invention are stable, inert (i.e. they do not react with moist atmospheres and substrates with which they can be employed), consistent, reproducible, and usable over a wide range of voltages. Additionally, after curing a curable binder in which the components of the invention may be dispersed, changes in voltage and temperature have substantially no effect on the resistance of the material, whether it is formed as a coating or as a solid.

A coating or solid with a TCR of zero is favourable in, say, cold environments such as the Arctic/Antarctic where wires and metals draw more amperage due to their negative TCR. Compositions with zero TCR can advantageously be used for a wide range of applications, such as heating of floors, wall, ceilings, roofs, and gutters. Further uses include preheating of engine oils in transport vehicles and power plants, local heating of batteries and auxiliary systems, heating cars and tankers carrying oil and other liquids, coal carrying vehicles, and for de-icing of aircraft wings. Additional uses include warming of components subjected to cold temperatures in use, heating of highways and other outdoor structures. Yet other uses include domestic/commercial appliances (dryers, irons, clothes presses, space heaters, cooking surfaces such as stoves, hot plates, woks, toasters, water heaters, coffee makers, furnaces, hot tubes, commercial/industrial/home ovens, etc.), medical equipment, helmets, apparel such as a jacket or jumper, and as a general replacement for resistant heating devices. These uses merely illustrate the broad range of applications in which the present invention finds utility. Other applications will be apparent to the skilled person.

Turning to US '156 and US '791 discussed above, whilst the compositions disclosed therein are useful, they also have some limitations. For example see Example 1 of US '791 which shows spot breakdown of the coating. Further, none of the coating compositions in US '791 exceed about 200° C., nor do they run at constant temperature above about 200° C. The compositions of the invention are adapted such that they operate above about 200° C. and can do so for months or years at a time and, as such, the compositions of the invention are an advance over these prior art compositions.

Additionally, only a limited number of carbon and graphite particles were actually tested in these prior art documents. Whilst both documents teach the use of a volatile solvent to prepare the coating compositions, only xylene is exemplified. Further, only high temperature silicon resins (binders) were tested, only two carbon materials (XE2 and L6) were exemplified, and only 2 graphite particles (from Superior Graphite) were trialled. None of these limited examples disclose a composition or material which has a TCR of zero or is substantially stable over a predefined temperature range. An example from US '791 was taken and 40 volts was applied. The current rose from 0.3 amps to 0.6 amps over an 8 week period, meaning that more current is required over time to sustain the temperature of the compositions, indicating that the composition would eventually run away and burn out over time.

Additionally, these documents only teach thin surface coatings, and do not teach or suggest solid compositions having a 3-D structure, such as a cylindrical rod. In contrast to these prior art documents, the present invention describes the use of particular carbon and graphite components which are selected such that the resulting combination produces a composition or material which has a TCR of zero or is substantially stable over a predefined temperature range. This enables higher temperatures to be achieved, and as the composition/material of the invention is stable over time the thermal output can be maintained for long periods of time. These prior art documents do not teach or suggest the provision of compositions having a TCR of about zero or being stable over a predefined temperature range. The present invention additionally enables the formation of 3D structures, rather than just surface coatings.

Additionally, these prior art documents had limitations with respect to solvent evaporation from the binders, which had the potential to result in some formulation instability and repeatability, especially when air dried. In certain embodiments of the present invention, the compositions are baked or fired to the maximum temperature tolerable by the binder to ensure solvent evaporation and formulation repeatability. In addition, when a water-based composition is formulated, it has been found that repeatability of the compositions is improved by air drying.

In relation to US '156, it has now been found that the Ketjenblack (carbon) is not useful in the present invention, because of a fume that is produced by these acetylene carbon blacks at temperatures of over 200° C. In other words, Ketjenblack carbon particles combined with graphite (or a second carbon, as discussed below) do not provide compositions having a TCR of zero when operated at above 200° C. The present invention includes the proviso that Ketjenblacks (acetylene carbon blacks) and similar carbons are excluded.

The present invention relates to forming solid mixtures, surface coatings or dry powder compositions optionally formulated in either a water-based or solvent-based system, which display TCR of zero, or which is substantially stable over a predefined temperature range. The compositions of the invention comprise smaller particle sizes of carbon and graphite compared to US '791 and US '156, and the carbon and graphite are present in relatively larger quantities in the resulting materials compared to US '791 and US '156. Additionally, the compositions of the invention can be formulated as solid mixtures and/or powdered mixtures. Without wishing to be bound by theory, it is contemplated that the compositions of the invention result in well-defined domains of carbon and graphite that provide more conductive/less resistive solid mixtures and coatings, and solve the stability and reproducibility issues of prior art electrothermic coatings.

By providing compositions which have a TCR of approximately zero, the compositions of the invention do not exhibit spot breakdown or thermal runaway. In one example, a composition with TCR of approximately zero was formulated and prepared as a surface coating and a current of 1.9 amps was applied to generate a constant temperature of 200° C. for 2 years. Over this time period the resistance of the composition remained constant at 110 ohms.

In a preferred embodiment, the thermal coefficient of electrical resistance is about zero or is substantially stable in a given temperature range. Preferably, the given temperature range is from about 200° C. to 550° C. in an airborne environment. Preferably, the thermal coefficient of electrical resistance is about zero or is substantially stable in a temperature range of from about 200° C. to 1200° C. in a non-airborne environment. Other ranges will be apparent to the skilled person.

It will be understood that the compositions of the invention are electrically conductive and exhibit electrothermic properties when alternating current (AC) or direct current (DC) are applied to them. It will be further understood that on application of electrodes and suitable current, the compositions and coatings emit and transmit heat to the surroundings through radiant, conductive, connective heating processes or through combinations of same. It will be understood that surroundings that are heated include air, gases, fluids, and solids of any nature that are in the vicinity of the coatings. This includes the substrates/materials which the compositions of the invention are applied to or incorporated into, as well as any supporting structures associated therewith. It will also be understood that the compositions of the invention and/or the materials made therefrom may be used in radiant, convective, and/or conductive heating applications and in the manufacture or assembly of device for use in these applications. Accordingly, in a preferred embodiment, the compositions of the invention and/or the materials made therefrom are used in the manufacture and/or assembly of a heating device which utilises radiant, convective, or conductive heating means, or combinations of same.

The compositions of the invention and materials produced therefrom may be used in a wide variety of applications requiring generation of heat, such as, for example, heating of floors, walls, ceilings, roofs, and gutters. For example, the compositions of the invention may be used for underfloor heating, for heating walls, and/or for heating ceilings. In some embodiments, the compositions of the invention are applied as part of a composite floor, wall or ceiling. In such embodiments, a waterproof sealant or an undercoat may be applied to form a layer upon which a layer of a composition of the invention may be applied, and upon which a top coat or waterproof sealant may be applied. In one embodiment, the composition of the invention is used for under floor heating according to the following general method: first, a primer layer is painted onto a suitable substrate, e.g., concrete slab; next, a waterproofing membrane is applied, e.g., an acrylic based waterproofing membrane composition is applied, and allowed to dry. Next, electrodes, e.g., conductive copper strips, are applied across the area to be heated at appropriate intervals, e.g., between 10 cm and 1 m apart, or between 40 cm and 1.5 m apart; next, a layer of the composition according to the invention is applied such that it is in electrical communication with the electrodes; finally, one or more layers of waterproof membrane composition may optionally be applied over the composition according to the invention and once dry, the composite connected via the electrodes to power supply, e.g., a 24 V power supply and to produce a heat-generating panel. Modifications of this method will be readily apparent to a person of skill in the art, e.g., a waterproofing membrane layer may be present above and below the layer comprising a composition of the present invention, or it may be above the layer comprising a composition of the present invention, or it may be below the layer comprising a composition of the present invention (with respect to the underlying slab or floor). There may be one or more coats, e.g., one coat, two coats, three coats, or two or more coats, of waterproofing membrane in any one "layer" of waterproofing membrane. There may be one or more coats, e.g., one coat, two coats, three coats, or two or more coats, of the composition of the present invention in any one "layer" comprising the composition of the present invention.

The electrothermic coatings/materials of the invention are preferably used in radiant heat sources in industry, for example in industrial ovens, such as conveyor ovens, widely used in industry for drying, curing, baking, shrink packaging, etc., or in infra-red radiant space heaters designed to heat relatively large enclosed or open spaces, other radiant heaters, such as incubators, hospital, barn stall heaters, incubation cabinets for bacterial cultures.

Alternatively, the electrothermic coatings of the invention may be used in as radiant heaters in household ovens or other household appliances, such as dishwashers and washing machines etc., in personal comfort heaters are designed for small space heating or conduction heating for individuals or a few objects. Other domestic application include, for example, sauna room heaters, hand dryers, hair dryers, cooking and restaurant appliances, including toasters, food warmers, griddles, electric frying pans, stoves and ovens, electric hot plates, grills and rotisseries and steam table warmers, or in slow heating devices such as water tanks. The electrothermic coatings of the invention can made into waterproof coatings that are suitable for applications involving water immersion without risk of material degradation or danger of electrical leakage or shock. Suitably, the materials can be used as immersion heating elements, and advantageously provide a low wattage density extended over a large area. Furthermore, in such applications, large bodies of water may be heated without local boiling or "hot spots", thereby obviating the need for circulating pumps. Thus the materials can be used as swimming pool or aquarium heaters, watering trough heaters, pond or lagoon heaters, and drainage ditch heaters.

The electrothermic coatings of the invention may also be used in the automotive or transport industries, wherein, the coating may be mounted on rigid boards or flexible carriers, operable from either line current or battery power, or from an engine alternator directly or through a power converter, and can be used in a variety of forms to supply the required radiant heat for a particular application. This category may include under-engine or oil pan heaters, under-hood heaters, battery heaters, interior comfort heaters, and the like. In another embodiment, the compositions of the invention may be used as paint for water or outdoor vessels or parts thereof. In other examples, surfaces of pipelines and storage tanks can be painted directly or wrapped with the electrothermic compositions of the invention impregnated into, or adhered to, a flexible tape or sheet carrier.

Further preferred uses include preheating of engine oils in transport vehicles and power plants, local heating of batteries and auxiliary systems, heating cars and tankers carrying oil and other liquids, coal carrying vehicles, and for de-icing of aircraft wings. Additional preferred uses include warming of components subjected to cold temperatures in use, heating of highways and other outdoor structures including, for example, airplane wing de-icing. Further uses still include home/commercial appliances (dryers, irons, clothes presses, space heaters, cooking surfaces such as stoves, hot plates, woks, toasters, water heaters, coffee makers, furnaces, hot tubes, commercial/industrial/home ovens, etc.), medical equipment, as a replacement for resistant heating devices, and the like.

In other embodiments, the compositions and materials of the invention are used in battery and storage device applications, as the inventive TCR=0 formulations assist in the constant charge and discharge of a battery during current charge and draw respectively. The compositions of the invention are particularly suitable for cold cranking amps battery applications, or for marine batteries or deep cycle batteries where high power and stability is required in cold environments.

According to a further aspect of the invention, there is provided a composition having a binder or a carrier and a combined amount of carbon and graphite between about 0.5 and 80 wt % of the total weight of binder or carrier and carbon and graphite, wherein the composition has a TCR of zero or is substantially stable over a predefined temperature range. Preferably the carbon is present in an amount of at least about 1 wt %. Preferably the combined amount of carbon and graphite is between 0.5 to 1%, 1 to 2% 2 to 5%, 5 to 10%, 10 to 20%, 20 to 30%, 30 to 40%, 40 to 50%, 50 to 60%, 60 to 70% or 70 to 80% of the total weight of the composition.

Carbon Component

Carbon black is an intense black powder made by incomplete combustion or thermal cracking of a hydrocarbon feedstock. Carbon blacks are classified as furnace blacks (produced by burning oil in 50% air), thermal blacks (produced through thermal decomposition of methane) and channel blacks (produced by direct combustion of fossil fuels or municipal waste). Carbon black is composed of nanometer-sized primary particles can bond together to form primary aggregates of various shapes and structure. The primary aggregates can cluster into larger agglomerates, forming fluffy, free-flowing powders, or they may be bonded into beads. Stable carbon black dispersions in water-based systems require selection of an appropriate dispersing agent suited to particular carbon black properties. The physical (size, shape, and distribution of primary particles) and chemical properties (adsorbed oxygen, surface functionalisation) of carbon black affect its dispersability. The particle size (fineness) of the carbon black is inversely related to the surface area. Small particle size (or high surface area) determines increased blackness, tint, UV protection, and electrical conductivity, but reduces dispersability. The term 'structure' describes the cluster morphology of primary aggregates, which can be either more compact (low structure) or more open (high structure). Low structure carbons are more difficult to disperse because of strong attractive forces acting between primary aggregates that cause packing together into larger clusters. The presence of chemical functionalities on carbon black assists in dispersion due to improved surface wetting, and localisation of electric charges to stabilize the dispersion. The pH or acid base character of the functional groups can impact the dispersability carbon blacks in water and/or aqueous mixtures or non polar solvents. High quality carbon black materials, often advanced surface-modified carbons may be required for applications requiring stable dispersions in water or solvent-based media.

Carbon black is characterised by the following methods. Electron microscopy is used to visualize the aggregate shape and to characterize the average size and morphology of primary particles (ASTM method D 3849-04). Nitrogen adsorption measurements at liquid nitrogen temperature are used to characterize the total surface area based on the Brunauer, Emmett, and Teller (BET) theory of multilayer gas adsorption (ASTM method D 6556-04). Structure characterization of carbon black is based on determination of the oil absorption number (OAN) (ASTM D 2414-05), based on detecting the volume of incorporated paraffin oil or dibuthylphthalate that is required to change the state from free powder to a semiplastic agglomerate state. High OAN values correlate roughly with high structure aggregates. Elemental analysis is used to determine impurities in carbon. The volatile content of carbon is a measure of oxygen surface complexes that may be present. It is obtainable by thermogravimetric analysis of carbon samples in a flow of inert gas or under vacuum. Upon heating, oxygen surface complexes decompose to yield $CO_2$ and CO. Surface functional groups determined by X-ray photoelectron spectroscopy (XPS) and Fourier-transform infrared (FTIR) spectroscopy. Potentiometric titration is used for identification and quantification of acid-base groups on carbons in an aqueous electrolyte.

The majority of carbon blacks are produced using furnace processes. Carbon black is composed of very small primary particles, which fuse to form branched aggregates. Post reactor operations include beading the "fluffy" low density black for improved storage and handling. Grades optimized for plastics use special manufacturing technology for improved dispersion, cleanliness and other targeted critical properties to enhance performance for specific applications. Higher structure carbon blacks are generally more easily dispersed than low structure carbon blacks of similar surface area. A high structure carbon black is one in which the aggregates are composed of many prime particles clustered together with considerable branching and chaining. As a result, the aggregates pack more poorly reducing the inter-aggregate attractive forces. Low structure carbon blacks are more compact, allowing closer packing and thus greater inter-aggregate attractive forces which makes dispersion more difficult. However, while more energy is necessary to disperse lower structure carbon blacks, their higher density allows them to "wet" or incorporate easier because there is less occluded air to displace. The structure of carbon black is measured through an oil absorption process, called dibutylphthalate absorption (DBPA or DBP). Thus, high structure grades of carbon black are distinguished from low structure grades by their higher oil absorptions.

A given grade of carbon or graphite is not usually produced at a single particle size but is made up of a range of particle sizes. In general, the mean particle size is referred to, but the breadth and shape of the distribution are also important factors in their performance. Smaller particle size (higher surface area) results in increases blackness, tint. UV protection and absorption, increases electrical conductivity, vehicle demand and viscosity, dispersibility, while higher structure (increasing DBPA), reduces blackness and tint, improves dispersibility, increases vehicle demand and viscosity, increases electrical conductivity. Higher porosity increases vehicle demand and viscosity, and enables reduced loadings in conductive applications. Higher surface activity (higher volatile content) Improves vehicle wetting and reduces viscosity of liquid systems. All of the above-mentioned fundamentals should preferably be considered when manufacturing and producing electrically conductive coatings and glazes according to the desired application.

Preferably carbon and graphite particles with relatively higher surface area and structures are used. Such particles are usually produced at higher temperatures. These particles withstand the high temperatures employed in firing glazes/glasses/frits without evaporating. In addition, as the carbon and graphite are highly conductive, a relatively lower amount is required in the composition, which is advantageous when formulating with glass fits and glazes.

The carbon particles of the invention are preferably made or produced by a process (or heat-treated at temperature of) at least 1000° C. Preferably the carbon particles have a specific conductance of up to 1000 $\Omega^{-1}\cdot cm^{-1}$ to 2000 $\Omega^{-1}\cdot cm^{-1}$. Preferably the specific conductance is selected between 1 to 10, 10 to 50, 50 to 100, 100 to 200, 200 to 300, 300 to 400, 400 to 500, 500 to 1000, 1000 to 2000 $\Omega^{-1}\cdot cm^{-1}$. The particles having a specific resistance of less than 500 Ω·cm are most preferable. An example of a suitable carbon particle for the present invention is:

Appearance: black power, odourdess
Specific resistance: 43 Ω·cm
Particle size: 33 nm
Iodine adsorption: 1070 g/kg
DBP absorption: 380 ml/100 g
$N_2$ adsorption (surface area): 1056 $m^2/g$
Tinting strength: 126%
pH value: 7
Loss on heating: 1.00%

In a preferred embodiment, the carbon black component may be selected from the group consisting of: conventional thermal blacks, furnace blacks, lamp blacks, channel blacks, highly purified carbons, surface-modified carbon blacks, surface functionalised carbon blacks, heat-treated carbons, nano carbons and combinations thereof. Particularly preferred carbons for use with the invention are furnace blacks, lamp blacks, channel blacks, surface modified carbon, and heat-treated carbon. These can be dispersible in solvent or dispersible in water.

On initial testing, it has been found that acetylene blacks are not suitable for use in the invention, as they produce a fume when brought up to temperatures past 150° C. The acetylene blacks are produced from acetylene gas and are not heat treated, and its chemical makeup and structure makes it different from furnace and channel blacks, which are suitable for use in the compositions and materials of the invention. The invention includes the proviso that electrically conductive carbon black particles generated by high temperature pyrolysis of acetylene (such as Ketjenblacks) are not used.

The carbon black particles may have a shape selected from the group consisting of flake-like, spherical-like, needle-like, plate-like, wire-like, tube-like, whisker-like, ball-like, single-wall, double-wall, multi-wall carbon nano tubes, buckyballs, quantum dots, and combinations thereof.

Particularly preferred are carbon black components which are acidic or neutral in pH. Preferred are carbon blacks having a pH in a range of between about 1 to about 8.5. Still other embodiments have a pH in the range of 3 to 9, preferably 4 to 8. However, certain applications are more suited to carbon blacks having an initial basic pH in a range of between about 9.5 to about 12. By way of example, carbon sourced from Jiangxi Eastern Dragon Charcoal Industry Co. Ltd is useful. The iodine content of this carbon is 1100 mg/g, and other properties are as per the following table:

| | |
|---|---|
| Specific surface area | 1350 $m^2/g$ |
| Iron content | 200 ppm |
| Ash content | 3% |
| PH Value | 3-5 |
| Moisture content | 10% |
| Mesh size | 200 mesh or 325 mesh |

Another useful carbon is "BP2000", which has a DBP absorption of 635, a surface area of 1440 $m^2/g$, particle size of 12 nm and a pH of 7.

Another useful conductive carbon is "Aquablak® 5292", which is 22% carbon and has a solids content of 28.8%, with a pH of 9.5-11.5, and is dispersed with an anionic surfactant.

Allotropes are different physical forms of the same element, such as a hard, highly structured crystal and a soft, less-structured substance. Allotropes differ in the way the atoms bond with each other and arrange themselves into a structure, Because of their different structures, allotropes have different physical and chemical properties. The three most common allotropes of carbon are diamond, graphite, and amorphous. The fullerene forms of carbon are a recent discovery and have been used in the past in several processes to create a conductive coating, paste, or the like with varying success.

In a preferred embodiment, an amorphous carbon is used to produce conductive compositions with a TCR of approximately zero or being substantially stable over a predefined temperature range. Preferred amorphous carbons are carbon black, also is known as channel black, furnace black, lamp black, thermal black, and noir de carbone. Other examples of amorphous carbon include charcoal and coal-derived fuel (coke). Average particle diameters in several commercially-produced carbon blacks range from about 0.01 to about 0.4 micrometers, while average aggregate diameters range from about 0.1 to about 0.8 micrometers. Most types of carbon black contain over 97% to 99% elemental carbon. Average aggregate particle diameters in several commercially produced carbon blacks range from 10 to 600 nm and the more loosely associated agglomerates can reach up to many micrometers in diameter.

The most preferred carbon black component is one that disperses well in a carrier or binder. As described below, carriers or binders can be solid, for example, dry powders; or a liquid, for example, a liquid wetting agent that is suitable for use with day, glass, glaze or ceramic compositions. Preferred carbon black components that form desirable dispersions and/or are of low pH include, but are not limited to, Cabot XC-72R Conductive, Cabot Monarch 800, Cabot Monarch 1300, Columbian T-10189, Columbian Conductex 975, Conductive, Columbian CC-40-220, and Columbian Raven 3500.

In a particularly preferred embodiment, surface modified or surface functionalised carbon blacks may be used. Preferred surface modification include, for example, carbon black surfaces with nitrogen absorption levels in a range of between 25 to 1400, which are indicative of surface areas between 85-2000 $m^2/g$. In some embodiments the carbon black surface has been functionalised. For example, carbon blacks having certain polar surface functionalities are particularly suitable for use with polar carriers such as water, polar solvents or aqueous solutions of such solvents, as they form excellent dispersions therein.

In a preferred embodiment, the average particle size of the carbon black component is in the range of between about 1 nm to 325 microns. In another preferred embodiment, the average particle size of the carbon black component is in the range of between 10 nm and 250 nm, or from 250 nm to 500 μm. Preferred particle sizes are between 1 to 10 nm, 10 to 50 nm, 50 to 100 nm, 100 to 250 nm, 250 to 500 nm, 500 to 1000 nm, 1 to 2 micron, 2 to 5 micron, 5 to 10 micron, 10 to 50 micron, 50 to 100 micron, 100 to 250 micron, or 250 to 500 micron, or any range in between.

In another preferred embodiment, the carbon black component is present in the composition in a concentration of between 1 and 65% wt of the total weight of the composition. Preferably in the range 1 to 2, 2 to 5, 5 to 10, 10 to 15, 15 to 20, 20 to 40, or 40 to 65 wt %.

In a preferred embodiment, the carbon black particles comprise particle aggregates of a size range characterised by having a dibutyl phthalate absorption in the range of between about 45 to 500 ml/100 g (as determined by ASTM D1510-12 Standard).

In a further preferred embodiment, the average particle size of the carbon black component is in the range of between about 10 nm to 1 micron. Carbons having a higher surface area are usually produced at higher temperatures, and are more conductive. Once comminuted, conductivity can be increased even further, which would mean less carbon is required in the formulations of the invention to achieve the same performance. Accordingly, relatively less binder is requred, and less wetting agents, solvents, plasticisers, etc, thereby making formulation relatively easier. Additionally, the use of smaller particle size conductive carbon mixed with relatively larger sizes of conductive graphite are anticipated to produce improved heat production from the novel and inventive coatings/solids/mixtures of the invention.

Graphite Component

The graphite particles which are particularly useful in the compositions of the invention have an average particle size in the range of between about 1 nm to 500 μm. Preferred particle sizes are between 1 to 10 nm, 10 to 50 nm, 50 to 100 nm, 100 to 250 nm, 250 to 500 nm, 500 to 1000 nm, 1 to 2 micron, 2 to 5 micron, 5 to 10 micron, 10 to 50 micron, 50 to 100 micron, 100 to 250 micron, or 250 to 500 micron, or any range in between.

The graphite particles are preferably heat treated, and a preferred temperature is at least 1200° C. Preferred graphite particles have a specific resistance of up to about 1000 Ω·cm to 4000 Ω·cm. Preferably the specific conductance is selected between 1 to 10, 10 to 50, 50 to 100, 100 to 200, 200 to 300, 300 to 400, 400 to 500, 500 to 1000, 1000 to 2000, 2000 to 3000, 3000 to 4000 $\Omega^{-1}\cdot cm^{-}$. Graphite particles having a specific resistance of less than 1000 Ω·cm are most preferable, in which case they need not be heat-treated. In a preferred embodiment, the graphite component is present in the composition of the invention in a concentration of between 1 and 65% wt of the total weight of the composition. Preferably in the range 1 to 2, 2 to 5, 5 to 10, 10 to 15, 15 to 20, 20 to 40, or 40 to 65 wt %.

In another preferred embodiment, the surface area of the graphite particles is between from about 25 to about 500 $m^2/g$. This range is suitable for most applications, however, in some applications it is desirable that particles comprise surface areas of up to 1400 $m^2/g$. Preferably the surface area is between 5 to 10, 10 to 20, 20 to 50, 50 to 100, 100 to 200, 200 to 500, 500 to 1000, 1000 to 2000 $m^2/g$.

In a preferred embodiment, the graphite component may be selected from the group consisting of; amorphous graphite, calcined petroleum coke, crystaline flake graphite, flake graphite, expandable graphite, purified flake graphite, purified crystalline flake graphite, purified petroleum coke, purified synthetic graphite, purified-vein graphite, synthetic graphite, and vein graphite.

Desirably, the graphite particles have a shape which may be selected from the group consisting of flake-like, spherical-like, needle-like, plate-like, wire-like, tube-like, whisker-like, ball-like, nano graphites, tubes, wires, and combinations thereof. The shape of preferred graphite particles is flake-like, plate-like, needle-like or wire-like, tube-like. In some preferred embodiments the preferred graphite particles are dispersible in water or in organic solvent.

It has been found that while the carbon black component influences the TCR value of the compositions of the invention, the nature of the graphite component influences the current loading of the compositions of the invention.

The primary feedstock used for making synthetic graphite is calcined petroleum coke and coal tar pitch, both of which are composed of highly graphitizable forms of carbon. The manufacturing process consists of various mixing, molding, and baking operations followed by heat-treating to temperatures between 2500° C. and 3000° C. The ultrahigh heat treatment temperature is required to drive the solid/solid, amorphous carbon-to-graphite phase transformation. The morphology of most synthetic graphite varies from flakey in fine powders to irregular grains and needles in coarser products. Synthetic graphite is processed at ultrahigh temperatures, and impurities contained in the precursor carbons are significantly reduced in concentration during processing. This occurs as a result of the high temperature vaporization of volatile impurities, which at the process temperatures utilized includes most metal oxides, sulfur, nitrogen, hydrogen, and all organic components that were part of the original petroleum or coal tar pitch. As a result of this thermal treatment, virtually all synthetic graphite products are high purity. Synthetic graphite is available in particle sizes from 1-micrometer powders to 2 cm pieces. Purities are typically 99+ % carbon.

Preferably the graphite has a particle size between 1-40 micron, carbon content from 80-99.9%, and is selected from a grade selected from: artificial (secondary), artificial (high purity—primary), natural amorphous, and natural crystalline flake, and combinations thereof.

The following graphites from ThermoPURE™ are suitable for the present invention: 1500 Series powder; 2500 Series powder; 2900 Series Crystalline Flake Graphite Oxidation Resistant; 3000 Series powder; 4200 Series powder; 4500 Series powder; 4700 Series powder; 4900 Series powder; 5000 Series powder; 5200 Series powder; 5500 Synthetic Graphite High Purity; 6500 Series powder, 7800 Series powder, 8000 Series powder and 9000 Series powder.

Resilient Graphitic Carbons™ are known to show the highest resiliency among all types of carbonaceous materials, and preferably PureBlack™, FormulaBT™ or Desulco grades are used in the invention. Other suitable graphites are sourced from TIMREX® Graphite Dispersions. These graphite dispersions are water based (solvent-free).

Carbon and Graphite Material Properties

In summary, the carbon component is chosen such that it has one or more of the following properties, and when combined with a specific graphite has a TCR of zero or is substantially stable over a predetermined temperature range:

Type (how produced), i.e. furnace/lamp/thermal/channel blacks/oil black;

Particle size, i.e. between 1 nm and 500 micron; preferably between 1 nm and 325 microns; or between 10 nm and 250 nm, or from 10 nm to 1 μm, or from 250 nm to 500 μm.

Surface area, i.e. between 85 to 2000 m2/g, preferably between 100 to 500 m2/g, or between 500 to 1000 m2/g, or between 1000 to 2000 m2/g.

Morphology (degree of aggregation and shape), i.e. low or high structure, and shapes such as flake-like, spherical-like, needle-like, plate-like, wire-like, tube-like, whisker-like, ball-like, single-wall, double-wall, multiwall carbon nano tubes, buckyballs, quantum dots.

- Iodine absorption, i.e. between 50 and 2000 g/kg, preferably between 50 to 100 g/kg or between 100 to 200 g/kg, or between 200 to 500 g/kg or between 500 to 750 g/kg, or between 750 to 1000 g/kg, or between 1000 to 1500 g/kg, or between 1500 to 2000 g/kg.
- Specific resistance, i.e. between 20 and 2000 Ω·cm; preferably between 20 and 100 Ω·cm, or between 100 to 200 Ω·cm; or between 200 to 500 Ω·cm; or between 500 to 1000 Ω·cm, or between 1000 and 1500 Ω·cm, or between 1500 to 2000 Ω·cm.
- DBP absorption: 25 ml/100 g to 1000 ml/100 g, preferably between 25 and 50 ml/100 g. or between 50 and 100 ml/100 g; or between 100 and 250 ml/100 g, or between 250 and 500 ml/100 g, or between 500 and 750 ml/100 g, or between 750 and 1000 ml/100 g.

In summary, the graphite component is chosen such that it has one or more of the following properties and when combined with a specific carbon has a TCR of zero or is substantially stable over a predetermined temperature range:

- Type (how produced), i.e. heat treated (1200° C. to 3000° C., or 2500 to 3000° C.) and selected from amorphous graphite, calcined petroleum coke, crystalline flake graphite, flake graphite, expandable graphite, purified flake graphite, purified crystalline flake graphite, purified petroleum coke, purified synthetic graphite, purified-vein graphite, synthetic graphite, and vein graphite.
- Particle size, i.e. between 1 nm and 500 micron, preferably between 1 nm and 325 microns; or between 10 nm and 250 nm, or from 10 nm to 1 μm, or from 250 nm to 500 μm.
- Surface area, i.e. between 25 to 1400 m2/g; preferably between 25 and 500 m2/g, or between 500 to 1000 m2/g; or between 1000 and 1400 m2/g.
- Morphology (shape), flake-like, spherical-like, needle-like, plate-like, wire-like, tube-like, whisker-like, ball-like, nano graphites, tubes, wires.
- Iodine absorption, i.e. between 50 and 2000 g/kg, preferably between 50 to 100 g/kg or between 100 to 200 g/kg, or between 200 to 500 g/kg or between 500 to 750 g/kg, or between 750 to 1000 g/kg, or between 1000 to 1500 g/kg, or between 1500 to 2000 g/kg,
- Percent crystallinity, i.e. between 40 and 99%, preferably between 40 to 50%, 50 to 60%, 70 to 80%, 90 to 95%, or 95 to 99%, or 99.9%, or greater than 99.9%.
- Specific resistance, i.e. between 20 and 2000 Ω·cm; preferably between 20 and 100 Ω·cm, or between 100 to 200 Ω·cm; or between 200 to 500 Ω·cm; or between 500 to 1000 Ω·cm, or between 1000 and 1500 Ω·cm, or between 1500 to 2000 Ω·cm.
- Conductivity horizontal direction: 100 to 2000 W/m·K; preferably 100 to 500 W/m·K, or 500 to 750 W/m·K, or 750 to 1000 W/m·K, or 1000 to 1500 W/m·K or 1500 to 2000 W/m·K
- Conductivity vertical direction: 1 to 100 W/m·K; preferably 1 to 25 w/m·K. or 25 to 50 W/m·K, or 50 to 75 W/m·K or 75 to 100 W/m·K.

Carbon:Graphite Ratios

In a further preferred embodiment the carbon:graphite ratio is chosen to be 1:1, 1:2 or 1:3. Alternative preferred carbon:graphite ratios are 2:1, 3:1, 4:1, 5:1, 6:1, 7:1, 8:1, 9:1, or 10:1. However, it will be appreciated that all the ratios in between these ranges are possible. The ratio of these components can be selected such that the TCR of the resultant composition or a material formed from the composition is about zero or is substantially stable over a predefined temperature range.

It has been discovered that use of a higher structured carbon will enable higher ratios of graphite to be used in the formulation, such as 1:3, 1:4, 1:5, 1:6, 1:7, 1:8, 1:9, or 1:10. This enables higher temperatures to be achieved whilst retaining a TCR of zero or one which is substantially stable over a predefined temperature range.

In some preferred embodiments of the invention combinations of different carbon particles and/or different graphite particles are used to tailor the TCR properties of the composition or a material formed from the composition such that the TCR is zero, or is substantially stable over a predetermined temperature range.

Without wishing to be bound by theory, it is contemplated that an equilibrium is set up between the carbon and graphite components of the compositions and materials of the invention which provide a TCR of approximately zero and which self-limit the thermal output of the composition/material such that it is stable for long periods of time and do not runaway or substantially degrade.

Binder and Carrier Component

A preferred composition according to the invention relates to combining carbon and graphite with a binder and applying the composition as a surface coating. The binder may be a glass fit or glaze with 1 to 90% by weight or volume of the carbon and graphite particles. Another preferred composition utilises carbon and graphite particles as a powder coating at 1 to 50% by volume or weight. Another preferred composition utilises a resinous binder, and if the molecular weight of the resin is relatively high then 1 to 20% by volume or weight of the carbon and graphite in resin can be used. In one embodiment the binder may be between 1 to 90 wt % of the total composition.

In some preferred embodiments, the composition or a material formed from the composition consists of: a film forming composition, a glaze forming composition, a glass forming composition, and enamel forming composition or a clay forming composition. It will be appreciated that the material formed from these compositions may therefore include coatings, films, glazes, glasses, enamels or clays. It will be understood that in a preferred embodiment, the compositions of the invention can be used to form sheets, films, or coatings that can be applied to a substrate or formed in situ thereon. For example, the composition may be applied to a substrate, preferably in a layer of uniform thickness and optionally cured/dried/fired to form a film or coating. Alternatively, preformed sheets, films, or coatings may be applied to a desired substrate. In a particularly preferred embodiment, the composition may be provided as coating or film forming composition, for the production of films, coatings, sheets, paints, glazes, enamels etc., to impart the advantages described herein to these materials. If desired, the films, sheets or coatings can be formed as a single layer or multilayers on a substrate or a material of interest. Preferred coatings or film forming compositions are formulated as liquid or powder coating compositions, depending on an intended application. Aqueous liquid formulations are particularly preferred.

In another embodiment, the composition of the invention may be incorporated into other materials during manufacture to impart to a final product the desirable electrical conducting electrothermic properties described herein. For example, the composition may be included as a component of a glaze forming, glass forming or porcelain forming composition.

In another example, the composition of the invention may be incorporated into another material, such as a frit, clay or a glaze composition, and cured therein to form an electrothermic conducting glass, porcelain or glaze.

The compositions of the invention are easy to handle and may be applied to a substrate by brush, roller coat, curtain coating with or without a knife, reverse roller coating, spray coating, or other conventional techniques.

Curing of the compositions can be via air-drying or it can involve baking/firing at a temperature for a suitable period to effect curing, drying or melting of the binder. Curing/firing conditions are well known to persons skilled in the art of such materials.

In another embodiment, the composition of the invention may be used as a dry mixture dispersed in a carrier. For example, a dry mixture such a dry powder is suitable for dry spraying, lacquering or electrostatic spraying applications. In another embodiment, the compositions of the invention may be formulated into matrices for thin or thick films, adhesives, sealants, and/or potting. In other preferred embodiments, the compositions may be processed in a dry form into wires, sheets, blocks, filaments, rods, roving or braids in film and sheet form, or combinations thereof. In some applications, the compositions of the invention can be used in finely divided form.

The compositions of the invention and materials formed from or incorporating same, have desirable properties including, but not limited to, at least one of neutral thermal co-efficient of resistance (TCR), voltage stability on application of AC or DC current, no thermal runaway or burn out, high performance electrical impendence properties, high heavy duty cycle degradation resistance, high resistance to moisture, heat, environmental, chemical and UV degradation, without loss or change to their electrical, mechanical, or physical, properties. Furthermore, the materials compositions and materials described herein self-regulate, meaning they are able to maintain constant resistance, voltage stability, and current drawn at any desired temperature in the range of from about from about −100° C. to about 1200° C., without experiencing any change their mechanical, physical, and electrical properties. In other words, they are conductively stable over time. Preferably, there is no more than 0.1%, or 1% or 2% or 5%, or 10% reduction in these properties over a time period of 1, 2, 3, 4, 5, 6, 7, 8, 9, 10, or 11 months, of 1, 2, 3, 4, or 5 years. Advantageously, it has been found that these properties can be maintained even when subjected to harsh processing such as dispersing, grinding, and shearing, drying and/or firing processes. Since the compositions and materials of the invention do not display varying properties with changes in temperature, voltage or time, they advantageously do not show "start-up" amperage or current surges.

In a preferred embodiment, the binder may be dispersed or dissolved in a solvent which may be a non-polar or a polar solvent. Suitably, the non-polar solvent may be selected from the group consisting of: carbon tetrachloride, benzene, diethyl ether, hexane, methylene chloride, chloroform, toluene, xylene, carbon disulfide, furfural and turpentine. Desirably, the polar solvent may be selected from the group consisting of: water, acetone, alcohols such as ethanol, propenol, butanol, formic acid, acetic acid, formamide, dimethyl sulfoxide, tetrahydrofuran, ethyl acetate, methyl ethyl ketone, acetonitrile, DMF or suitable combinations/mixtures thereof. The most preferred polar solvent is water or aqueous solutions of water and other polar solvents. Water is particularly preferred because is inexpensive, non-toxic and environmentally friendly.

Suitable binders may be selected from the group consisting of: organic, inorganic, natural, synthetic, animal, vegetable, or mineral, aqueous, solvent, thermoplastic, thermosetting, rigid, flexible binder systems and combinations thereof. More particularly, suitable binders include, but are not limited to, acrylics, alkyds, carbon fibre, cellulosics, epoxies, fluoro-plastics, ionomers, natural rubber, nylons, phenolics, polyamides, polybutadienes, polyesters, polyamides, polypropylenes, polyurethanes, silicone resins, and silicone rubbers, styrene-butadiene, nitrile rubbers, polysulphide rubbers, vinyl-ethyelene, polyvinyl acetates; silicates and polysilicates, cements, such as hydraulic setting Portland cement, sodium aluminates and gypsum, glass compositions such as glass frits, ceramic and refractory compositions, and minerals, such as bentonite, and combinations thereof. Since the coatings/materials of the invention can generate high quantities of heat, in certain applications the binder used should be able to withstand elevated temperatures. Thus, heat-stable resins should be used including, for example, silicone resins. See, for example. Solomon, The Chemistry of Organic Film Formers, Robert E. Krieger Publishing Company, Huntington, N.Y. (1977).

For example, in one embodiment the binder is a rubber, such as a nitrile rubber (NBR), styrene butadiene rubber (SBR), silicone rubber, butyl rubber or polybutadiene. In another embodiment, the binder is a polymeric resin, e.g., an acrylic resin such as a polymer of ethyl acrylate, methyl acrylate, methacrylic acid, acrylic acid, acrylamide, acrylonitrile, or a mixture of any two or more of these monomers, or a derivative of any one or more of these monomers. In one embodiment, the binder has a glass transition temperature (Tg) of less than 0° C., e.g., a Tg of between −150° C. and 0° C. or between −150° C. and −120° C., between −150° C. and −100° C., between −150° C. and −50° C., between −100° C. and −50° C., between −75° C. and 0° C., between −50° C. and 0° C., between −10° C. and 0° C., between −150° C. and −25° C., or of −150° C., −140° C., −130° C., —120° C., −110° C., −100° C., −90° C., −80° C., −70° C., −60° C., −50° C., −40° C., −30° C., −20° C., −10° C., or 0° C. In some embodiments, the binder is an acrylic resin (e.g., an acrylate-based resin) having a Tg of less than 0° C. In some embodiments, the binder is a polymeric resin having a Tg of less than 0° C. In some embodiments, the binder is a rubber having a Tg of less than 0° C.

The composition may further comprise at least one additional additive component selected from the group consisting of dispersants, surfactants, clay materials or formers such as kaolinite clays, silica, talc, glaze materials or formers, coating materials or formers, frit materials or formers, silicas, and inert extenders such as, for example, titanium dioxide, zinc oxide, other metal oxides, colourants, opacfiers, inhibiting pigments, plasticizers, pigment suspending agents, flow levelling agents, catalysts, drying agents, surfactants, tinctorial pigments, and a wide variety of other conventional additives. In one embodiment, the compositions herein are devoid of elemental metal particles. In another embodiment, the compositions herein are devoid of a metal compound such as a metal oxide, metal carbide, metal nitride, etc. For example, the composition herein may be devoid of metal or metal oxide, optionally devoid of metal and metal oxide. In one particular embodiment, the compositions herein are devoid of a metal oxide, e.g., metal oxide particles. For example, the compositions herein may be devoid of a metal oxide such as zinc oxide, managanese oxide, etc. In one embodiment the compositions herein are devoid of elemental and metal oxide particles. In one particular embodiment, the compositions herein are devoid of zinc oxide, managanese oxide or a combination of both of these oxides.

Inclusion of dispersion agents is desirable for improvement of the quality of dispersion in a carrier. Preferred dispersants can be selected from the group consisting of: anionic, cationic, electroneutral, amphoteric and non-ionic dispersants.

Anionic surfactants can be selected from: Sodium Lauryl Ether Sulfate; Sodium Alcohol Ether Sulfate: Sodium Lauryl sulfate; Sodium Dodecyl Sulfate; Linear Alkyl Benzene Sulfonic Acid; Sodium Alpha-Olefin Sulfonate; Linear Alkylbenzene Sulfonate; Methyl Ester Sulffonate; Ammonium Lauryl Ether Sulfonate.

Nonionic surfactants can be selected from: Cocamide; Cocamide; Lauroyl Dithanolamide; Emulsifier.

Cationic surfactants can be selected from: Benzalkonium Chloride/Alkyl dimethylbenzyl ammonium chloride; Hexadecyl trimethyl ammonium chloride.

Amphoteric surfactants can be selected from: Cocamidopropyl betaine; Lauryl betaine/Dodecyl dimethyl betaine; Cocamidopropyl dimethylamine oxide; Lauramidopropyl betaine; Lauramidopropyl dimethylamine oxide; Lauryl dimethylamine Oxide/N,N-dimethyl; Cocamidopropyl hydroxysultaine; Lauramidopropyl hydroxysultaine.

Other compounds such as heptamethyltrisiloxane can be used such as: polyalkyleneoxide modified heptamethyttrsliloxane (pH 5.0-7.0, Specific gravity 25° C. 1.011, Viscosity 25° C.; 30-60, Solubility in water, acetone, xylene, toluene and an oil substance; Surface Tension (0.1%) 22.6 (mN/m)).

Thermoplastic or thermosetting resin systems can be advantageously used in applications involving a maximum temperatures of about 250° C. Where applications require higher temperatures, and degradation is a concern, higher temperature resistant binders may be used. For example, HIPS can be applied by spray equipment, roller or brush, and cures from ambient temperature to below 90° C. As water-based products, HIPS coatings are free of volatile organic compounds, do not burn and do not release smoke or toxic chemicals at temperatures up to 1200° C.

It will be understood that the proportions of components and additives used in preferred compositions of the invention will dependent on a particular desired application, processing requirements and desired properties of materials formed therefrom.

In one aspect of the invention, the compositions of the invention and/or the materials made therefrom may be used in finely divided form, as a filament, wire, rod, roving or braids in film and sheet form, or in combinations of same. It will be appreciated that they may be used in conventional electrical conduction devices, for example, wires, cables, bus bars, etc.

In another embodiment, the compositions of the invention may used as a paint or anti-static or anti-discharge coatings. Non limiting uses include paints/coatings for water vessels or parts thereof, or for covering relatively large areas and to produce sufficient heat density to melt snow and ice and prevent their formation. Suitably, the anti-static coatings of the invention may be used, for example, as anti-static paint, coated transfer film, coated sheeting, and as coated floor tiles. These material are useful in applications such as chemicals and plastics processing, where fine powders and dusts are handled, television receivers, delicate electrical instruments rooms, rugs and wall coverings, hospital operating rooms, paint factories, munitions plants and munitions and rocket propellant loading facilities, where static build up can be problematic. The coatings are useful in these applications as they exhibit a stable resistance over the entire range of operating temperatures.

In a related aspect of the invention, other preferred applications include a means for signalling or information transmission and status reporting by utilising the electromagnetic oscillations of the infrared radiation generated, for example, in an infrared sensors, whereby output from the sensor, usually in the form of an electrical signal, can be employed to activate, deactivate, or control an electrical or mechanical device. The invention provides a means of carrying electrical current and thus substituting for more conventional electrical conduction devices, such as wires, cables, bus bars, etc.

The selection of binder can be important for various applications, in which the physical, chemical, and electrical properties of the binder must be considered. Thermal resistance, that is, the ability to withstand exposure to the high degree of heat encountered in the application should be considered, especially where the material will be used at temperature for prolonged periods. Preferably the binder exhibits no significant degradation or physical changes which would affect the behaviour of the composition, or functioning of the material. Other important considerations are:

- that the binder facilitates adhesion to the substrate to which it will be applied, and to the conducting electrodes;
- good cohesion and film-forming ability under pigment volume loading required to hold the concentration of pigment necessary for a particular application;
- a coefficient of thermal expansion which approximates that of the substrate so that the coating will not crack or delaminate from its substrate or applied electrodes;
- a low viscosity at a sufficiently high solids content to permit the incorporation of the pigment volume loading required for a particular application;
- a degree of film flexibility, after drying and cure, required by the application;
- little or no physical or chemical effect on the substrate to which it will be applied;
- ability of the film to withstand the physical and chemical and environmental stresses to which it will be subjected; (e.g. vibration, shock, humidity, water, salt spray, solvents, acids, alkalis, temperature extremes, temperature cycling, sunlight (UV radiation), ozone, fungal and bacterial degradation, etc.);
- capability of aging with time and use without any significant changes (breakdown) in these physical and chemical properties and without migration of the incorporated pigments; and
- non-flammability or self-extinguishing characteristics.

Glazes, Glasses, Fits, Clays, Porcelains, Enamels, and Powder Coats Etc

Although the term glaze is commonly applied to a prepared mixture of materials, either powder or a suspension in water, ready for application to ceramic ware, in its fired form it may simply be regarded as a ‘glassy coat’. The glassy coat is formed by a three-dimensional network of glass formers and network modifiers. Common oxides used to form glasses include network formers, such as $B_2O_3$, $SiO_2$, $P_2O_5$, intermediates, such as $Al_2O_3$, $ZrO_2$, $TiO_2$ and network modifiers SnO, MgO, ZnO, $Li_2O$, CaO, SrO, BaO, $Na_2O$, $K_2O$. When a selected combination of network formers and intermediates/network modifiers are cooled from a high temperature, the resultant supercooled liquid is referred to as a glass. In the case of glazes, the glass is invariably a complex silicate or borosilicate containing a minimum of 40% $SiO_2$. Raw materials used in the manufacture of glazes include many high quality beneficiated minerals such as feldspars, quartz, clays, zircon, limestone and dolomite, together with a number of technical grade materials such as zinc oxide, barium carbonate and alumina. Of particular importance in the formulation of glazes is the part played by frits. There are three commonly used types of borax frit granules, namely borax frits, lead bisilicate frits and lead borosilicate frits. These specially-melted frits (glasses) were initially developed to render soluble components such as lead oxides and borax into an insoluble form. In modern times their use has extended into almost all low- to medium-firing glazes. The introduction of faster or fast firing cycles involves an even greater use of high frit content glazes. In addition to the above materials, many glazes contain opacifiers or pigments. The most commonly used glaze opacifiers are zircon, tin oxide or titania. Typical pigments include calcined stains such as zircon vanadium blue, zircon iron coral or the zircon praseodymium yellow and, oxides such as iron ($Fe_2O_3$) cobalt (CoO), chrome ($Cr_2O_3$) and manganese ($MnO_2$). Various agents are commonly added to the ground glaze to control the rheology of the glaze slurry and the application properties. These include, but are not limited to suspending agents, flocculants, deflocculants, binders, bactericides, organic dyes, wetting agents, and antifoam agents.

The formulation of a glaze is dependent on a number of factors, al of which must be considered if the correct choice of glaze is to be made. Type of fired appearance—transparent or opaque, white or coloured, glossy or matt; type of substrate—body composition, body expansion; firing cycle—heating rate, peak temperature and time, cooling rate; method of firing—gas or electric, muffle or open flame, tunnel or intermittent, kiln atmosphere—oxidising, reducing, neutral; chemical properties—low solublity, leadless, low metal release, acid/alkali durability; physical properties—strength, abrasion resistance, crazing resistance; electrical properties—electrical resistance, electrical conduction, semi conducting.

In some embodiments, the total weight of carbon and graphite in the composition/material total between 1 to 60 wt % of the binder.

Use of Fabrics with Carbon and Graphite

A material formed from a composition of the invention may be formulated into a fabric. The skilled person will appreciate what kinds of fabrics can be woven from a fibre or a tape, such as plain, basket, twill and satin weave. The compositions of the invention can also be formulated into glass and aramid binders.

The inventor contemplates that carbon and graphite (or carbon and carbon, see below) can be added directly into the manufacturing process to make glass or polymer fibre at a concentration of between 1-65 wt %. For example, in relation to glass fibre the carbon and graphite can be added in the furnace, refiner or the forehearth stage of glass fibre production as per FIG. 4.

The dry powder conductive graphite and carbon compositions (and carbon/carbon compositions) of the invention can also be used for dry powder prepreg processes to produce advanced composites. The compositions of the invention are useful in the production of high-melt viscosity high-performance polymers. Dry powder prepregging enables the manufacture of, and measurement of, the mechanical and electrical properties of carbon fiber not to be limited by application, e.g. other forms of carbon fibre, fabric performs, and CFRP prepregs.

In another embodiment, the carbon and graphite can be added into a solid or liquid additive for plastic production (masterbatch). In another embodiment, the carbon and graphite can be added into precursors for carbon fibres, such as polyacrylonitrile (PAN), rayon and pitch (see FIG. 5). The carbon, graphite, and/or their ratio in the resultant carbon fibre composition are selected such that that the composition or a material formed from the composition has a thermal coefficient of electrical resistance (TCR) of about zero or is substantially stable over a predefined temperature range.

Carbon and Carbon Embodiment

According to a ninth aspect of the invention there is provided an electrothermic composition comprising:

at least a first carbon component;

at least a second carbon component: and an optional binder or carrier;

wherein the first carbon component, the second carbon component, and/or their ratio are selected such that that the composition or a material formed from the composition has a thermal coefficient of electrical resistance (TCR) of about zero or is substantially stable over a predefined temperature range.

According to a tenth aspect, the present invention provides a product produced by the electrothermic composition according to the ninth aspect, or a material formed from the composition.

According to an eleventh aspect, the present invention provides a method for controlling the thermal coefficient of electrical resistance (TCR) of a material, the method comprising the steps of: providing a composition comprising at least one carbon component with at least a second carbon component, wherein the first carbon component, the second carbon component, and/or their ratio are selected such that that a material formed from the composition has a thermal coefficient of electrical resistance (TCR) of about zero or is substantially stable over a predefined temperature range.

According to a twelfth aspect, the present invention provides a method for generating heat, the method comprising the steps of:

(a) forming a composition or a material formed from the composition, wherein the composition comprises: an optional carrier or binder; at least one carbon component; and at least a second carbon component;

(b) attaching electrodes to said composition or a material formed from the composition;

(c) connecting said electrodes to a source of electricity; and (d) energizing said source of electricity, thereby generating heat from said composition or a material formed from the composition, wherein the first carbon component, the second carbon component and/or their ratio are selected such that that the composition or a material formed from the composition has a thermal coefficient of electrical resistance (TCR) of about zero or is substantially stable over a predefined temperature range.

In relation to the thirteenth aspect, preferably at an applied voltage and current, the heat generated from the composition or a material formed from the composition is substantially constant over a predetermined time period. In this embodiment, it will be appreciated that the first carbon component, the second carbon component and their ratio in the resultant composition are selected such that that the composition or a material formed from the composition has a thermal coefficient of electrical resistance (TCR) of about zero or is substantially stable over a predefined temperature range.

According to a fourteenth aspect of the invention, there is provided a method of preparing an electrothermic composition comprising the steps of:

(i) selecting a predetermined ratio of at least one carbon component and at least a second carbon component such that the composition is electrically conductive, electrothermic and will have a thermal coefficient of electrical resistance of about zero or is substantially stable over a predefined temperature range; and (ii) preparing the composition by mixing said at least one carbon component and said at least one second carbon component, optionally in a suitable binder or carrier.

In a fifteenth aspect of the invention, there is provided a method of preparing an electrothermic material comprising the steps of:

combining a composition of the invention with a carrier and applying the resultant mixture to a substrate to form a coating, film or layer thereon; or combining a composition of the invention with a curable binder and applying the resultant mixture to a substrate to form a coating, film or layer thereon and applying suitable curing conditions to substantially cure said binder.

According to a sixteenth aspect of the invention, there is provided a composition having a binder or a carrier and a combined amount of a first carbon component and a second carbon component between about 0.5 and 80 wt % of the total weight of binder or carrier and carbon, wherein the composition has a TCR of zero or is substantially stable over a predefined temperature range. Preferably at least one carbon component is present in an amount of at least about 1 wt %.

According to another aspect of the invention there is provided an electrothermic composition comprising:

a first carbon component;

a second carbon component;

an optional carrier or binder wherein the first carbon component, the second carbon component, and/or their ratio are selected such that that the composition or a material formed from the composition has a thermal coefficient of electrical resistance (TCR) of about zero or is substantially stable over a predefined temperature range.

Preferably the first carbon component is a conductor and the second carbon component is a resistor. Preferably the temperature resistance of the conductive carbon component is at least 0.00010 per ° C. and the temperature resistance of the resistive carbon component is between −0.0003 to −0.001 per ° C.

Preferably, the first carbon component has a surface area of between 200 and 2000 $m^2/g$, preferably 200 to 500 $m^2/g$, or 500 to 1000 $m^2/g$, or 1000 to 2000 $m^2/g$. The first carbon component has particle diameters of between 1 nm to 1 micron, preferably 1 to 250 nm, or 250 to 600 nm. Preferably the first carbon (conductor) component also has a specific conductance of not more than about 1000 $\Omega^{-1}\cdot cm^{-1}$ to 2000 $\Omega^{-1}\cdot cm^{-1}$, preferably 1000 to 1500 $\Omega^{-1}\cdot cm^{-1}$, or 1500 to 2000 $\Omega^{-1}\cdot cm^{-1}$. Particles having a specific resistance of less than 500 Ω·cm are most preferable, The surface area of the second carbon component is 1% to 80% less than of the first carbon component, preferably 1% to 25%, or 25% to 50% or 50% to 80%, iodine absorption of the second carbon component is 1% to 80% of the first carbon component, preferably 1% to 25%, or 25% to 50% or 50% to 80%. Particle diameters of the second carbon (resistor) component of between 100 nm to 1 um are preferred. Particularly, 100 to 250 nm, or 250 to 500 nm, or 500 to 750 nm, or 750 nm to 10 micron. Preferably, the first carbon component has a pH range of 1-7, more preferably 1 to 3 or 3 to 5 or 5 to 7. Preferably the second carbon component has a pH range from 5 to 12, more preferably, 5 to 7, or 7 to 9, or 9 to 10 or 10 to 12.

Method of Microwave Curing to Provide an Electrothermic Composition

According to a further aspect of the invention there is provided a method for providing an electrothermic composition comprising:

providing at least one carbon component and at least one graphite component dispersed in a curable resin, or a first carbon component and a second carbon component dispersed in a curable resin; and directing sufficient energy to the curable resin for a sufficient time to substantially cure the resin, wherein the carbon, graphite and/or their ratio, or the first and second carbon components and/or their ratio are selected such that that the composition or a material formed from the composition has a thermal coefficient of electrical resistance (TCR) of about zero or is substantially stable over a predefined temperature range.

Preferably, the energy is microwave energy. In a preferred embodiment, the microwave energy is applied at a frequency range of 1 MHz to 46 GHz, preferably 1 MHz to 100 MHz, or 100 MHZ to 500 MHz, or 500 MHz to 750 MHz, or 750 MHz to 1 GHz, or 1 GHz to 10 GHz, or 10 GHz to 20 GHz, or 20 GHz to 30 GHz, or 30 GHz to 40 GHz, or 40 GHz to 46 GHz (up to 110 GHz with external mixer). In a particularly preferred embodiment, the frequency range is 1 GHz to 100 GHz, or 1 to 40 GHz. In yet another embodiment, the frequency range is 6 GHz to 24 GHz. In an embodiment requiring 1 mm-1 meter, the preferred frequency range is 300 GHz-300 MHz. In an embodiment requiring 390 nm-750 nm, the preferred frequency range is 770 THz-400 THz.

Uses of the Composition

According to a seventeenth aspect, the invention provides use of a composition comprising at least one carbon component with at least one graphite component for controlling the thermal coefficient of electrical resistance (TCR) of a material, wherein the carbon, graphite, and/or their ratio are selected such that that a material formed from the composition has a thermal coefficient of electrical resistance (TCR) of about zero or is substantially stable over a predefined temperature range.

According to an eighteenth aspect, the invention provides use of a composition or a material formed from the composition, for generating heat, wherein the composition comprises: an optional carrier or binder at least one carbon component; and at least one graphite component; wherein the carbon, graphite, and/or their ratio are selected such that that the composition or a material formed from the composition has a thermal coefficient of electrical resistance (TCR) of about zero or is substantially stable over a predefined temperature range.

According to a nineteenth aspect, the invention provides use of a composition comprising at least a first carbon component and at least a second carbon component for controlling the thermal coefficient of electrical resistance (TCR) of a material, wherein the first carbon component, the second carbon component, and/or their ratio are selected such that that a material formed from the composition has a thermal coefficient of electrical resistance (TCR) of about zero or is substantially stable over a predefined temperature range.

According to an twentieth aspect, the invention provides use of a composition or a material formed from the composition, for generating heat, wherein the composition comprises: an optional carrier or binder: at least one carbon component; and at least a second carbon component;

wherein the first carbon component, the second carbon component, and/or their ratio are selected such that that the composition or a material formed from the composition has a thermal coefficient of electrical resistance (TCR) of about zero or is substantially stable over a predefined temperature range.

According to a twenty-first aspect, the invention provides use of a composition comprising at least one carbon component and at least a second carbon component for preparing an electrothermic composition, wherein the carbon, graphite, and/or their ratio are selected such that that a material formed from the composition has a thermal coefficient of electrical resistance (TCR) of about zero or is substantially stable over a predefined temperature range.

According to an twenty-second aspect, the invention provides use of a composition comprising an optional carrier or binder; at least one carbon component; and at least a second carbon component for preparing an electrothermic composition; wherein the wherein the first carbon component, the second carbon component, and/or their ratio are selected such that that the composition or a material formed from the composition has a thermal coefficient of electrical resistance (TCR) of about zero or is substantially stable over a predefined temperature range.

BRIEF DESCRIPTION OF THE DRAWINGS

Preferred embodiments of the invention will now be described, by way of example only, with reference to the accompanying drawings in which:

FIGS. 1*a* and 1*b* are images of the carbon black VULCAN® XC72 in a glass glaze after heating at 400° C. and 650° C., respectively;

DEFINITIONS

Figure 2:
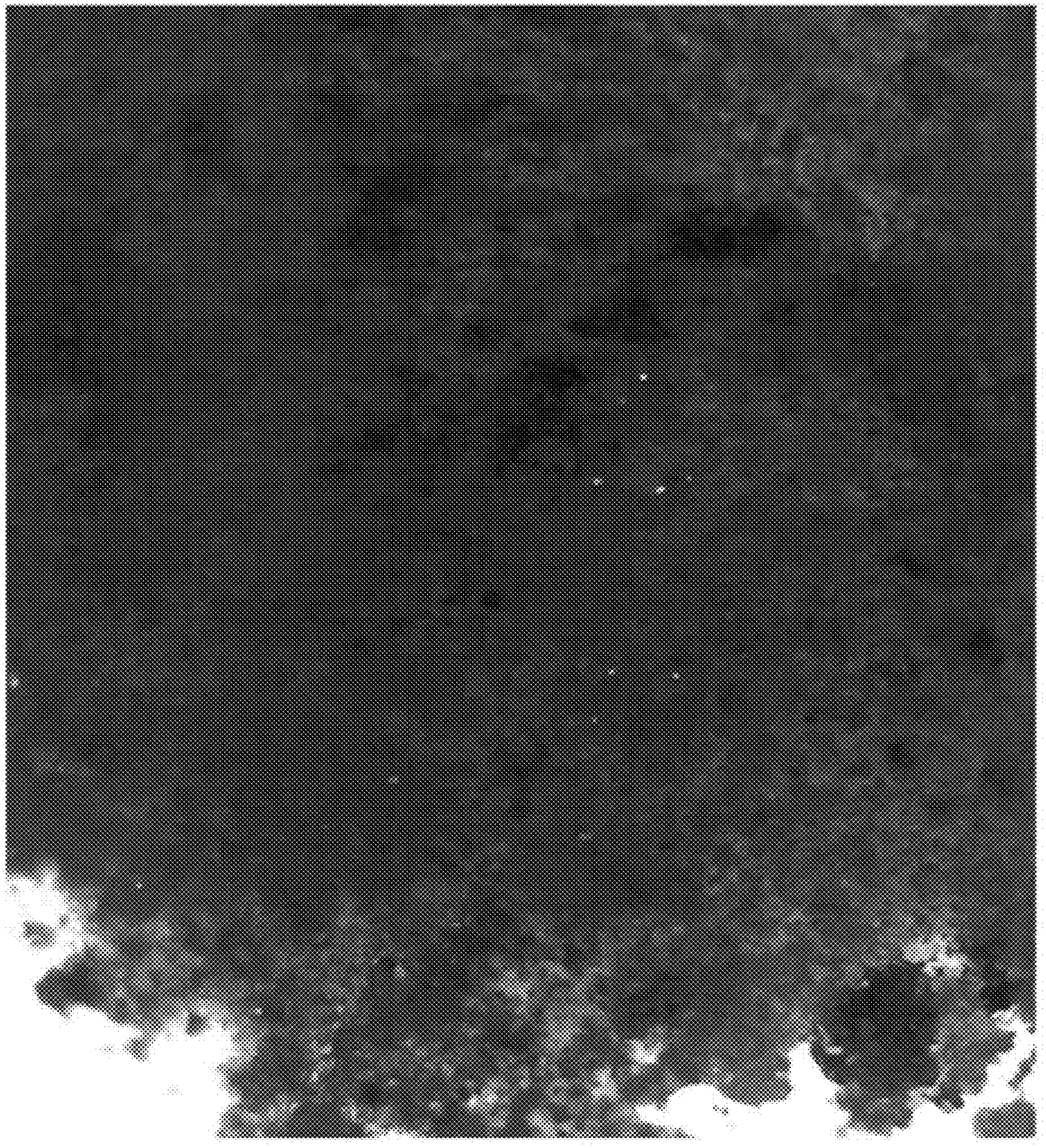
FIG. 2 is same carbon black component before exposure to heat and not incorporated into a vehicle.

In describing and claiming the present invention, the following terminology will be used in accordance with the definitions set out below. It is also to be understood that the terminology used herein is for the purpose of describing particular embodiments of the invention only and is not intended to be limiting. Unless defined otherwise, all technical and scientific terms used herein have the same meaning as commonly understood by one having ordinary skill in the art to which the invention pertains.

Unless the context clearly requires otherwise, throughout the description and the claims, the words 'comprise', 'comprising', and the like are to be construed in an inclusive sense as opposed to an exclusive or exhaustive sense; that is to say, in the sense of 'including, but not limited to'.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising", "consisting of", and "consisting essentially of", where one of these three terms is used herein, the presently disclosed and claimed subject matter may include the use of either of the other two terms. Thus, in some embodiments not otherwise explicitly recited, any instance of "comprising" may be replaced by "consisting of" or, alternatively, by "consisting essentially of".

To provide a more concise description, some of the quantitative expressions given herein are not qualified with the term 'about'. It is understood that whether the term 'about' is used explicitly or not, every quantity given herein is meant to refer to the actual given value, and it is also meant to refer to the approximation to such given value that would reasonably be inferred based on the ordinary skill in the art, including approximations due to the experimental and/or measurement conditions for such given value. In what follows, or where otherwise indicated, '%' will mean 'weight %', 'ratio' will mean 'weight ratio' and 'parts' will mean 'weight parts'. The examples are not intended to limit the scope of the invention.

The recitation of a numerical range using endpoints includes all numbers subsumed within that range (e.g., 1 to 5 includes 1, 1.5, 2, 2.75, 3, 3.80, 4, 5, etc.).

The terms 'preferred' and 'preferably' refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

DETAILED DESCRIPTION OF THE INVENTION

Example 1—Preparation and Application of Coatings

In this example, coatings are made by initially forming a pigment grind and then letting down the grind in additional solvent with the incorporation of additives as is necessary, desirable, or convenient. Basic compositions are described in the following examples.

Mixture A: 10 g Hi-Black 40B2 carbon pigment (Evonik HIBLACK® 40B2; DBP absorption 130, surface area 153 $m^2/g$) was ground to 500 microns using a high-speed cyclone mill. 20 g natural graphite (from AMP metals Australia) was added (92% purity flake graphite). A final mesh size of 325 micron was established for Mixture A.

Mixture B: 10 g Hi-Black 40B2 pigment was ground to 550 microns using a high-speed cyclone mill. 40 g of natural graphite (from AMP metals Australia) was added. These powders were added to 350 mls of glaze, placed in two one litre plastic containers under a high-speed disperser and dispersed at 8000 rpm for 5 minutes. The mixture was allowed to cool. Both mixtures were quite viscous, and mixture B required an additional 20 mls of water.

Mixtures A and B were made up and sprayed out on 46×30 cm (18"×12") panels. The panels were then allowed to dry and the voltage and current were recorded at room temperature of 20° C. Copper electrode tape (from 3M) was applied to both sides of a pair of 48 cm long×30 cm wide (18 inch long×12 inch wide) enamel coated metal oven trays, at 30 cm (12 inch) spacing. Mixture A was applied to one plate, while Mixture B was applied to the other by spray gun at $6.2\times10^5$ Pa to $9.7\times10^5$ Pa (90 to 140 psi), and the glaze mixtures were allowed to air dry.

AC current at 240V was applied to plate with Mixture A (20 g graphite). The panel was brought up to temperature 193° C. The current drawn was measured at 1.9 amps and it remained constant at this value for 24 months. The plate was allowed cool to room temperature (20° C.), and current was applied again and the amps drawn were measured at 1.9 amps where it remained, with a resistance of 110 ohms.

AC current at 240V was applied to Mixture B (40 g graphite). The panel was brought up to a temperature of 183° C. The current drawn was measured at 1.8 amps, with a resistance of 125 ohms and it remained constant at this value for 24 months. The plate was allowed to cool to room temperature (20° C.) and the resistance increased to 197 ohms. Current was reapplied and current drawn was found to drop to 1.1 amps at room temperature. On reheating, the current increased to 1.8 amps and the resistance decreased to 125 ohms where it remained stable.

These examples demonstrate that for the Mixture A, the TCR value is zero over the range of temperatures measured, since the current drawn remains constant at 1.8 amps. In Mixture B the temperature recorded was 183° C. the current drawn was 1.8 amps and the resistance was 125 ohms. The sample remained at this value and then was allowed to cool to room temperature of 20° C. The resistance increased to 197 ohms, and then current was applied again. The current dropped to 1.1 amps at room temperature. The current was then increased to 1.8 amps and the resistance decreased to 125 ohms where it remained stable. This is a demonstration of the stability of the compositions, which display a TCR of zero.

Since mixture A does not change its resistance or the amount of current drawn when cooled to room temperature and when reheated, it shows a constant TCR value of substantially zero. However, the second panel shows increase in resistance and lowering of the current drawn when cooled to room temperature, which shows that the carbon particle has a constant TCR value at a given ratio of graphite.

In Mixture B, where higher amounts of graphite are used, the carbon black component does not appear to have the ability to stabilise the TCR at zero. This indicates that the proportions of carbon black and graphite in the compositions of the invention are important in stabilizing the TCR values and, accordingly, affect the physical properties of the coatings, glazes, and compositions of the invention.

Example 2

Composition A: Copper tape was placed 25 cm (10 inches) apart on porcelain coated 30×30 cm (12×12") plates, 10 g of Hi-Black 40B2 carbon and 300 mls glaze were mixed in a high-speed disperser until the particle size of the carbon in the glaze reached 500 nm. An evaporation type ink drawdown gauge was used to measure the particle sizes. A further 50 mls of glaze was added, followed by 30 g of natural vein graphite with a particle size of 325 microns. The mixture was allowed to mix for a further minute. 150 mls of Composition A was sprayed onto one of the 30×30 cm (12×12") porcelain panels at a spray pressure of about $9.0\times10^5$ Pa (130 psi). The panel was air dried and resistance and current drawn were measured. At an applied voltage of 240V, current drawn was 1.87 amps, while the resistance was 114 ohms, and the temperature produced by the panel was 296° C.

Composition B: Copper tape was placed 25 cm (10 inches) apart on porcelain coated 30×30 cm (12×12") plates. 10 g of Hi-Black 40B2 carbon and 300 mis glaze were in a high-speed disperser until particle size of the carbon in the glaze reached 500 nm (evaporation type ink drawdown gauge was used to measured the particle sizes). A further 50 mls of glaze was added, followed by 30 g of 2935 Thermo pure flake graphite with a particle size of 325 microns. The mixture was allowed to mix for a further minute. 150 mls of Composition B were sprayed onto one of the 30×30 cm (12×12") porcelain panels at a spray pressure of about $7.6\times10^5$ Pa (110 psi). The panel was air dried and resistance and current drawn were measured. At an applied voltage of 240V, the current drawn was 1.91 amps, while the resistance was 111 ohms, and the temperature produced by the panel was 193° C.

It can be seen from these examples that varying the graphite source alone caused a difference in temperature of 103° C. Accordingly, without wishing to be bound by theory, the graphite seems to controls the heat generation. Whilst carbon has been found to be the main contributor to the neutral TCR values of these formulations, graphite is useful in the present compositions as a controller of heat generation. The graphite seems to control the amount of heat, meaning that it is a resistor, and that the concentration of it in the material will to some extent control the amount of heat being generated, but a certain amount of carbon is required in order to provide a TCR of approx 0 so that it is stable over time.

Example 3

Test 1: 10 g of the graphite component or the carbon black component (VULCAN® XC72) is placed into a crucible made of a refractory grade ceramic and placed in an electric kin at 400° C. for five minutes. The crucible is withdrawn and allowed to cool and the weight is recorded. If there is no loss recorded in weight after heating, a high magnification visual inspection is carried out to examine for any visual heat stress or damage to the composition, such as burning, weight loss or significant changes in colour. If no visual damage is apparent and the conductive properties remain the same compared to before heating, the material is considered suitable for use in the compositions of the invention. This procedure can also be used to determine the minimal temperature required for cross-linking or fusing the components of the composition into glazes, glass frit porcelains, enamels, and powder coats, etc.

An example of a visual examination is shown in FIGS. 1$a$ and 1$b$, in which the FIG. 1$a$ image is a sample of the carbon black VULCAN® XC72 in a glass glaze. After heating at 400° C., the image shows there is no visible damage to the carbon black or glass glaze. FIG. 1$b$ shows the results for heating VULCAN® XC72 in a glass glaze at temperatures of 650° C. which is above the melting point of this carbon black. The damage caused by melting is clearly evident. It is believed that the ash part of the carbon black is the first part of the structure to degrade, particularly when electrical current and high temperatures are applied. It is believed that the smaller ash particles get hotter when electrical current is applied compared to the larger carbon particles. For example, the darker ash particles in FIG. 1$a$ are observed to be very stable throughout the coating but FIG. 1$b$ the smaller darker ash particles have enlarged and melted causing craters indicating visual damage and carbon black particle failure.

FIG. 2 illustrates the same carbon black component before exposure to heat and not incorporated into a vehicle. The smaller darker particles are the ash content. It should be noted that small losses in weight will occur at 950° C. for most carbon blacks. This loss is generally 1.5% to 25% and depends on the structure, the type of carbon black, its manufacturing process, and the length of time the carbon is exposed to those temperatures.

Test 2: In this test, the temperature is elevated slowly to between 600° C. and 1100° C. to investigate the melting points of the carbon black conductive particles or their weight loss. Since the time required to complete this aspect of testing can extend over hours to days, their structure and conductivity and their ability to maintain their electrical connection with each other in these glasses and glazes can be simultaneously tested. This provides an opportunity to match the carbon black with an appropriate glass frit for ease of application and formulation and formula modification. Also, acquiring the right glass frit and firing temperatures of these conductive glazes and matching of these glazes to the conductive particles, the connector, and the substrate on which they are applied is important. In other words, matching the coefficient of thermal expansion with the conductive graphite, conductive carbon, the connector, and the glaze, and also the substrate must be considered. Preferably the melting point of the glaze or glass is below that of the conductor, the resistor, and the connector. While temperatures of up to 1100° C. have been utilised herein, it is envisaged that temperatures of as high as 3425° C. (6917° F.) can be utilised when used as conductors in arc furnaces. However, since both carbon and graphite mixtures above 950° C. in an airborne environment are hard to maintain because of carbon evaporation, high temperature pigments, such as thermally purified processed graphites and carbons, with high structure to extremely high structures will have to be included in the compositions. Some graphites can be used to temperatures of around 3600° C. and some pure carbons can also achieve these temperatures.

Test 3: The third test relates to procedures for introduction of the composition of the invention into glazes, glasses, frits, days, porcelains, enamels, and powder coats. Preferably the carbon and graphite particles go through the following tests and the final weights recorded to test for final loss of weight at a set temperature. Their electrical resistance is preferably tested against a dry non-fired sample to investigate their electrical properties, mechanical properties and physical properties for degradation. In most cases this can be done by using an oil absorption process, for example, dibutylphthalate absorption (DBPA or DBP). Thus, comparative testing between treated and original absorption factors indicates changes in properties (D1510-12, Standard Test Method for Carbon Black). The carbon black samples tested were a.) DERUSSOL® NA 9 Carbon Black Component: carbon electrical resistivity in PP 8 wt. % carbon black: 43 Ω·cm; iodine absorption between 1075 and 1125 mg/g; DBP-absorption between 380 and 420 ml/100 g; ash content %≤1.0≤2.0; sulfur content %≤0.4≤0.8; fleetingness at 105° C.≤1.0≤1.0; pH-value 7-8; and b.) carbon black from Jiangxi Eastern Dragon Charcoal Industry Co. Ltd: iodine value: 1100 mg/g, specific surface area: 1350 $m^2$/g, Iron content: 200 ppm, ash content 3%, pH Value: 3-5, moisture content 10%, chloride: ≤0.05%, mesh size: 200 mesh or 325 mesh. After testing, carbon sample (a) had a weight loss of 3 to 5%; and carbon sample (b) had a weight loss of 14%. 20 g of each material was placed in to 1200° C. ceramic dish and then placed into a Kiln at 400° C. for five minutes. They were then allowed to cool and removed from the kiln. They were re-weighed and this was repeated at 500, 600 and 700° C. in an airborne environment. At 400° C. carbon a.) had no weight loss, and carbon b.) had a 3% weight loss. At 500° C. carbon a.) had 2% weight loss and carbon b.) had a 6% weight loss. At 600° C. carbon a.) had a weight loss of 4% and carbon b.) had a 9% weight loss. At 700° C. carbon a.) had a weight loss of 5% and carbon b.) had a weight loss of almost 14%. Preferred carbons to be used in these glazes have a 1 to 5% loss at these temperatures.

Test 4: TCR testing of glaze comprising a graphite and carbon combination according to the invention. The compositions of the invention to be tested are sprayed onto a metal panel having a dielectric enamel coating applied thereto. The panel is then air dried and the current and resistance at certain applied voltages is recorded. The panels are then placed in the kiln and fired at the appropriate temperatures. The panels are withdrawn from the kiln and allowed to cool and their current and resistance at certain applied voltages are recorded, again at room temperature. The coated panels are then placed into a deep freezer at −23° C. and left for approximately 24 hours at which time they were removed and their amps, ohms, volts recorded again after which the panels are allowed to warm to room temperature. The coated panels are then placed into an oven and bought up to temperature of around 250° C. and they are removed from the oven hot and their amps, ohms, volts are recorded again. If the coatings have the same constant resistant values at room temperature and in a deep freezer and in the oven then their TCR values are zero or at substantially zero. Ground coat was applied to both sides of steel metal panels measuring 22×20 cm (8½"×8"). The ground coat was used as a dielectric surface between metal and the coatings/glazes of the invention. In this case the firing temperature was 990° C. After firing at 450° C., the panel was allowed to cool to room temperature. The resistance was recorded at 320 ohms, and then 150V AC was applied. The current drawn was 1.1 amps and the panel reached 190° C. The panel was allowed to cool and the resistance was recorded again at 320 ohms. The panel was then placed into a refrigerator and taken down to −23° C. and the resistance was measured at 334 ohms. The panel was placed back into the oven and reheated to 250° C. and the resistance measured at 322 ohms. Therefore, the TCR is zero.

TCR Investigations of Glaze Material Before Firing

Formulation and application procedures for unfired conductive glazes, elements, coatings, enamels, porcelains, and coatings before firing will be now described. The glazes can be applied by brush or roller, but are preferably sprayed onto the surface to be coated. The components of the compositions were ground in the following order using a high-speed cyclone mill: 10 g High black 40B2, ground to 550 microns, then 20 g graphite 2935K from superior graphite was added. It was left at a larger mesh size of 325 microns. The powders were then added to 350 mls of glaze and placed in a 1 L plastic container under a high-speed disperser and the mixture was operated at 8000 rpm for 5 minutes. The mixture was then allowed to cool. The resulting mixture was quite viscous.

Copper electrode tape from 3M was applied to a second 46×30 cm (18×12") coated enamel metal oven tray and glaze mixture was applied by spray gun and allowed to air dry. AC current at 240V was applied and the panel was brought up to temperature. The temperature recorded was 200° C., and the current drawn was 1.9 amps. It has remained at this level for two years and four months and is still maintaining the same resistance of 110 ohms at the time of writing. This particular sample is unfired.

A second formulation was prepared. Components in the following order were ground using a high-speed cyclone mill. 10 g DERUSSOL Carbon NA 9 carbon black (Degussa) was ground to 550 microns. 30 g graphite 2939 K from Superior Graphite's USA was then added and was left at a larger mesh size of 325 microns. The mixture of powders was then added to 450 mls of glaze and placed in a 1 L plastic container under a high-speed disperser and the mixture was operated at 8000 rpm for 5 minutes. The mixture was then allowed to cool the mixture was found to be quite viscous. The TCR values are in the following paragraph.

Copper electrode tape (3M) was applied to both sides (30 cm; 12 inches apart) of an 46×30 cm (18×12") plate (900° C.) coated enamel metal oven tray. The glaze mixture was applied by spray gun at around $6.2\times10^5$ Pa to $9.0\times10^5$ Pa (90 to 130 psi) and allowed to air dry. Current at 240 V was applied to bring the panel up to temperature (310° C.). The current drawn was 1.8 amps. It remained at this temperature and resistance (90 ohms) for 2 years and four months. This particular sample is unfired.

These results demonstrate that the compositions of the invention have a TCR of zero and hold temperature for long periods of time without degradation. In other examples, the carbon and graphite compositions of the invention (or the carbon/carbon compositions of the invention) can be incorporated into aluminium oxide powder and pressed into a solid brick or pressed into a solid rod to, for example, make a heating element. These compositions have a TCR of approximately 0 and can remain at elevated temperatures in an airborne environment for extended periods of time. In other examples, the carbon and graphite compositions of the invention (or the carbon/carbon compositions of the invention) can be incorporated into refractory materials. In one example, the compositions of the invention are incorporated into Thermobond. Thermo bond is a two part system (dry powder formulation and liquid activator) added together to form a uniquely bonded refractory material The Liquid activator is acid based in the bonded system. An example formulation below thermobond powder 1 kg carbon DERUSSOL Carbon NA 9 carbon black (Degussa) 20 g and graphite 20 g (from AMP metals Australia) was added (92% purity flake graphite), liquid activator 900 mils mixed together uniformly which created a thick slurry. 200 g of the mixture was applied to a fire brick at 0.5 mm thickness. The brick was exposed to microwaves for 20 seconds and the temperature of the mixture increased from room temperature (20° C.) to 110° C. The brick was allowed to cool and removed from the microwave. The thermobond was completely cured. The brick was exposed to microwaves again for 10 seconds and the top surface rose to 220° C. This particular sample was left for three weeks, and then microwaved for 10 seconds. The surface of the brick rose to 218° C., which is a good demonstration of retained electrical values of these particles when exposed to microwaves. The second brick with Copper electrodes were applied to the brick and on the application of 240 V at 1 amp a temperature of 240° C. was achieved. The temperature of this brick rose 3° C. in eight weeks and the current and resistance stayed the same.

TCR Investigations of Glaze Material after Firing

Firing temperatures of glazes and matching of the properties of the glazes to the substrate which they are applied can be quite important. Some of the firing temperatures used in these tests are as follows. Cross-linking/fusion temperatures and firing temperatures are preferably in the range of 150° C. to 1200° C. Higher cross-linking/fusion temperatures are used from 1200° C. through to 2100° C. in special applications, while lower firing temperatures between 200° C. and 550° C. are used in other applications. The fusion/melting temperature can be chosen depending on the glass frit used and the melting point of the conductor, resistor, connector and in some cases the substrate. These conductive glazes, glass frits, porcelains, and powder coats have the ability to be recoated and refired to add additional conductivity to the first coating. These coatings can also be laminated between each other to be a multiple layer heating device or system. These discoveries can be utilised in many different applications other than heating. Multilayer material or glazes, or coatings with specific mechanical physical and electrical properties can be used electronic electrical memory storage or other multilayer devices.

All enamelling processes described herein involve the mixture and preparation of frit (the unfired enamel mixture); preparation of the substrate; the application of the coating, firing of the coating; and then finishing processes. Most applications involve two layers of enamel: a ground-coat to bond to the substrate and a cover-coat to provide the desired external properties. The ground coat in the present examples are glazes which are fired at or below these temperatures, but in some special applications firing temperature can go up beyond 1400° C. For example, ground coat was applied to both sides of steel metal panels measuring 20×20 cm (8"×8"). The ground coat was used as a dielectric surface between the metal and the coatings/glazes of the invention. In this case the firing temperature was 990° C. Two copper electrode tapes were applied to the surface 20 cm (8 inches) apart on the plate (copper tape by 3M with a high temperature adhesive). Glaze mixtures were applied by spray gun at $6.2\times10^5$ Pa to $9.0\times10^5$ Pa (90 to 130 psi) and the panels were air dried. The coated glaze appeared to be about 1 mm in thickness when wet and 0.5 mm when dry. An electric kin is then brought up to temperature of 450° C. The panel was then placed inside the oven for approximately 1 minute after which it was removed and allowed to cool, and the resistance was recorded as 320 ohms. Using a varaic transformer, 150V of AC was applied and temperatures of 190° C. at 1.1 amps from the panel was recorded for 5 months. This shows the ability of these particles to cross-link into a glass and maintain their electrical connectivity.

The resistance of the dry panel before firing was 100 ohms and increased to 320 ohms on firing. An increase of 220 ohms in resistance must be taken into consideration when formulating, such as by decreasing the amount of clay or glass frit in the formulation of the glaze and by the addition of other materials to lower the firing temperature and increase melt flow rate of the glazes. The dramatic increase in resistance on firing is thought to be due to the cross-linking of the glaze reducing the connection between the conductive particles. Also, inclusion of the glass glaze coating and the copper tape connections is thought to increase the resistance. It has been found that the increase in resistance varies from 10% to 220% depending on the nature of the conductive carbon and graphite in the compositions of the invention used and the nature of the glaze.

An example of a formulation of the microwave curing embodiment is given below:

Resin composition: 68% solids siloxane (TempTech 32800 clear with 32% xylol) sourced from Pittsburgh's paint and glass (500 mL).

Carbon black: 5 grams carbon black E90 Specific surface area 1250 m2/g. Ash content 1%; pH Value 7, mesh size=200 mesh.

graphite 99% pure spherical; average density 1.65 gm/cm; 10 grams and average particle size 100 μm both carbon and graphite supplied by Jiangxi Eastern Dragon Co. Ltd China Both carbon and graphite (supplied by Jiangxi Eastern Dragon Co. Ltd China) were mixed together. The mixture was placed into laboratory disperser and blended at 5000 rpm for one minute. The mixture was then removed from the disperser and 100 ml placed into a microwaveable Pyrex dish, which was placed into a microwave oven. The microwave oven was set on defrost mode for 20 seconds, and the temperature of the mixture went from 20° C. to 90° C. in 20 seconds. The mixture was allowed to cool and then tested for curing. The mixture was approximately 85% cured. The mixture was then placed back into the microwave for another 15 seconds. The temperature of the mixture went from 20° C. to 70° C. The mixture was allowed to cool and the test indicated that the composition or mixture was 98% cured. The mixture was then placed back into the microwave for a third time for another 10 seconds. The microwave was set on defrost mode and the temperature rose from 20° C. to 90° C. The mixture was then allowed cool to room temperature.

A true RMS Fluke multimeter (model number 681) was used to test the dry resin mixture. The resistance recorded was 530 ohms at 20° C. The mixture was then placed back into the microwave for another 10 seconds. The temperature of the mixture went from 20° C. to 93° C. The mixture was allowed to cool to 2° C. and then the resistance was recorded again at 529 ohms. The dry resin mixture in the Pyrex dish was then placed into a refrigerator and taken down to −18° C. The resistance was again measured at 535 ohms. The microwave oven used in this experiment is a Samsung 1100 series 240 V at 50 Hz 1500 W running at 2450 MHz at 1000 W output.

Table 1 below illustrates Examples of the present invention using a first carbon component and a second carbon component. These mixtures were tested and displayed a TCR of about zero or were substantially stable within the parameters defined. It was also found that the TCR was about zero or remained substantially stable both when the composition was unfired or when it had been fired.

TABLE 1

| Carbon and Carbon Examples | | | |
|---|---|---|---|
| | Composition | mix | units |
| Example 1 | | | |
| surface area of 1440 m2/g | BP2000 | 30 | grams |
| surface area of 270 m2/g | HIBLACK ® 600L | 10 | grams |
| | Duncan pure translucent glaze | 1000 | ml |
| | TEGO ® Disper 750 W | 60 | GRAMS |
| Example 2 | | | |
| surface area of 270 m2/g | HIBLACK ® 600L | 25 | grams |
| surface area of 150 m2/g | HIBLACK ® 420B | 10 | grams |
| | Duncan pure translucent glaze | 800 | ml |
| | TEGO ® Disper 750 W | 20 | GRAMS |
| Example 3 | | | |
| surface area 1250 m2/g | carbon black E90 | 25 | grams |
| surface area 770 m2/g | Vulcan XC 72 | 15 | grams |
| | Duncan pure translucent glaze | 1100 | ml |
| | TEGO ® Disper 750 W | 70 | grams |
| Example 4 | | | |
| surface area 1250 m2/g | carbon black E90 | 25 | grams |
| surface area 138 m2/g | HIBLACK ® 30L | 20 | grams |
| | Duncan pure translucent glaze | 850 | ml |
| | TEGO ® Disper 750 W | 60 | grams |

Table 2 below illustrates Examples of the present invention using a carbon component and a graphite component. These mixtures were tested and displayed a TCR of about zero or were substantially stable within the parameters defined. It was also found that the TCR was about zero or remained substantially stable both when the composition was unfired and when it had been fired.

TABLE 2

| Carbon and Graphite Examples | | | |
|---|---|---|---|
| | Composition | mix | units |
| Example 1 | | | |
| surface area of 1440 m2/g | BP2000 | 30 | grams |
| (99% purity flake graphite | 5500 Synthetic Graphite | 10 | grams |
| | Duncan pure translucent glaze | 800 | ml |
| | TEGO ® Disper 750 W | 40 | GRAMS |
| Example 2 | | | |
| surface area of 270 m2/g | HIBLACK ® 600L | 25 | grams |
| (92% purity flake graphite | Graphite AMP | 10 | grams |
| | Duncan pure translucent glaze | 600 | ml |
| Example 3 | | | |
| surface area 1250 m2/g | carbon black E90 | 25 | grams |
| (92% purity flake graphite | Graphite AMP | 15 | grams |
| | Duncan pure translucent glaze | 800 | ml |
| | TEGO ® Disper 750 W | 20 | grams |
| Example 4 | | | |
| surface area 1250 m2/g | carbon black E90 | 25 | grams |
| (99% purity flake graphite) | 5500 Synthetic Graphite | 20 | grams |
| | Duncan pure translucent glaze | 850 | ml |
| | TEGO ® Disper 750 W | 20 | grams |
| Example 5 | | | |
| surface area 270 m2/g | PRINTEX U | 15 | grams |
| (92% purity flake graphite | Graphite AMP | 30 | grams |
| | Duncan pure translucent glaze | 600 | ml |
| Example 6 | | | |
| surface area 1050 m2/g | Raven 7000 | 25 | grams |
| (92% purity flake graphite | Graphite AMP | 15 | grams |
| | Duncan pure translucent glaze | 800 | ml |
| | TEGO ® Disper 750 W | 30 | grams |

Table 3 below illustrates Examples of the present invention using a carbon component, a graphite component and a sioxane binder. These mixtures were tested and displayed a TCR of about zero or were substantially stable within the parameters defined. It was also found that the TCR was about zero or remained substantially stable when the composition was unfired or when they had been fired.

TABLE 3

Carbon, Graphite and Binder Examples

| | Composition | mix | units |
|---|---|---|---|
| Example 1 | | | |
| surface area of 1440 m2/g | BP2000 | 30 | grams |
| (99% purity flake graphite | 5500 Synthetic Graphite | 10 | grams |
| 68% solids siloxane | TempTech 32800 PPG | 200 | ml |
| % pigment | Solvent, xylene | 100 | ml |
| 16.7% | % pigment to binders | 20.00% | |
| Example 2 | | | |
| surface area of 1440 m2/g | BP2000 | 25 | grams |
| (92% purity flake graphite | Graphite AMP | 10 | grams |
| 68% solids siloxane | TempTech 32800 PPG | 220 | ml |
| % pigment | Solvent, xylene | 110 | ml |
| 13.7% | % pigment to binders | 15.91% | |
| Example 3 | | | |
| surface area 1250 m2/g | carbon black E90 | 25 | grams |
| (92% purity flake graphite | Graphite AMP | 15 | grams |
| 68% solids siloxane | TempTech 32800 PPG | 400 | ml |
| % pigment | Solvent, xylene | 70 | ml |
| 7.8% | % pigment to binders | 10.00% | |
| Example 4 | | | |
| surface area 1250 m2/g | carbon black E90 | 25 | grams |
| (99% purity flake graphite | 5500 Synthetic Graphite | 20 | grams |
| 68% solids siloxane | TempTech 32800 PPG | 270 | ml |
| % pigment | Solvent, xylene | 60 | ml |
| 12.0% | % pigment to binders | 16.67% | |
| Example 5 | | | |
| surface area m2/g | PRINTEX U | 15 | grams |
| (92% purity flake graphite | Graphite AMP | 30 | grams |
| 68% solids siloxane | TempTech 32800 PPG | 200 | ml |
| % pigment | Solvent, xylene | 100 | ml |
| 13.0% | % pigment to binders | 22.50% | |
| Example 6 | | | |
| surface area 1050 m2/g | Raven 7000 | 25 | grams |
| (92% purity flake graphite | Graphite AMP | 15 | grams |
| 68% solids siloxane | TempTech 32800 PPG | 400 | ml |
| % pigment | Solvent, xylene | 70 | ml |
| 7.8% | % pigment to binders | 10.00% | |

Testing was conducted on various graphites in an opaque glaze to determine their resistance at various ratios in the glaze. The following graphites were tested:

a.) TIMREX® Primary Synthetic Graphite b.) TIMREX® Natural Flake Graphite c.) TIMREX® Coke d.) Lectromet (sourced from ESPI Metals)

e.) Electro (sourced from ESPI Metals)

f.) Aeromet (sourced from ESPI Metals)

g.) ESPI Super Conductive (sourced from ESPI Metals)

h.) Thermo pure (sourced from Superior graphite company)

i.) Graphite (sourced from Ashbury)

The specific supplier information on these graphites can be seen in the tables below.

| Material | units | TIMREX ® Primary Synthetic Graphite | TIMREX ® Natural Flake Graphite | TIMREX ® Coke |
|---|---|---|---|---|
| Thickness | Mm | 0.1 | 0.2 | 0.2 |
| Specific Gravity | g/cm$^3$ | 1.5 | 0.9 to 2.0 | 1.5 to 1.8 |
| Volume Resistivity | Ω/CM | 3.0 * $10^{13}$ | 3.0 * $10^{13}$ | 3.0 * $10^{13}$ |
| Conductivity (vertical direction) | w/m-k | 20 | 15 | 5 |
| Conductivity (horizontal direction) | w/m-k | 300 to 500 | 300 to 500 | 300 to 500 |

| | GRADE: | | | |
|---|---|---|---|---|
| | Lectromet | Electro | Aeromet | ESPI Super Conductive |
| Average Apparent Density gm/cm$^3$ | 1.65 | 1.74 | 1.80 | 1.82 |
| Coefficient Thermal Expansion $10^{-6}$ ° C. (° F.) | 7.7 (4.3) | 8.3 (4.6) | 8.5 (4.7) | 8.5 (4.7) |
| Electrical Resistivity 21° C. (70° F.) ohm · m (uohm-in) | 1.9 × $10^{-5}$ (750) | 1.6 × $10^{-5}$ (630) | 1.5 × $10^{-5}$ (580) | 1.8 × $10^{-5}$ (690) |
| Porosity (um) | 0.6 | 0.7 | 0.8 | 0.8 |

Figure 3:
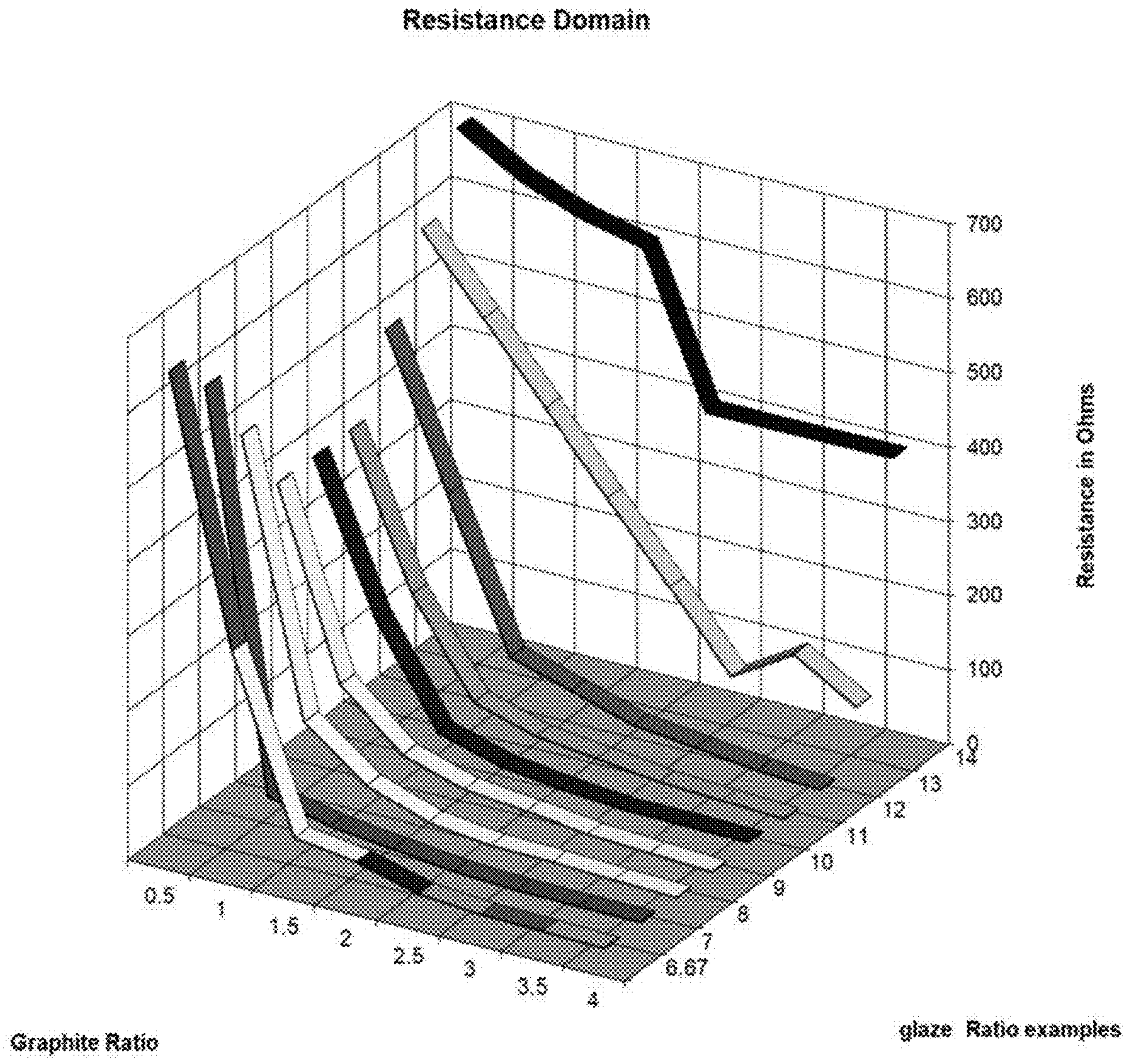
FIG. 3 is graph of resistance for various graphite materials dispersed in various ratios in a glaze.
Figure 4:
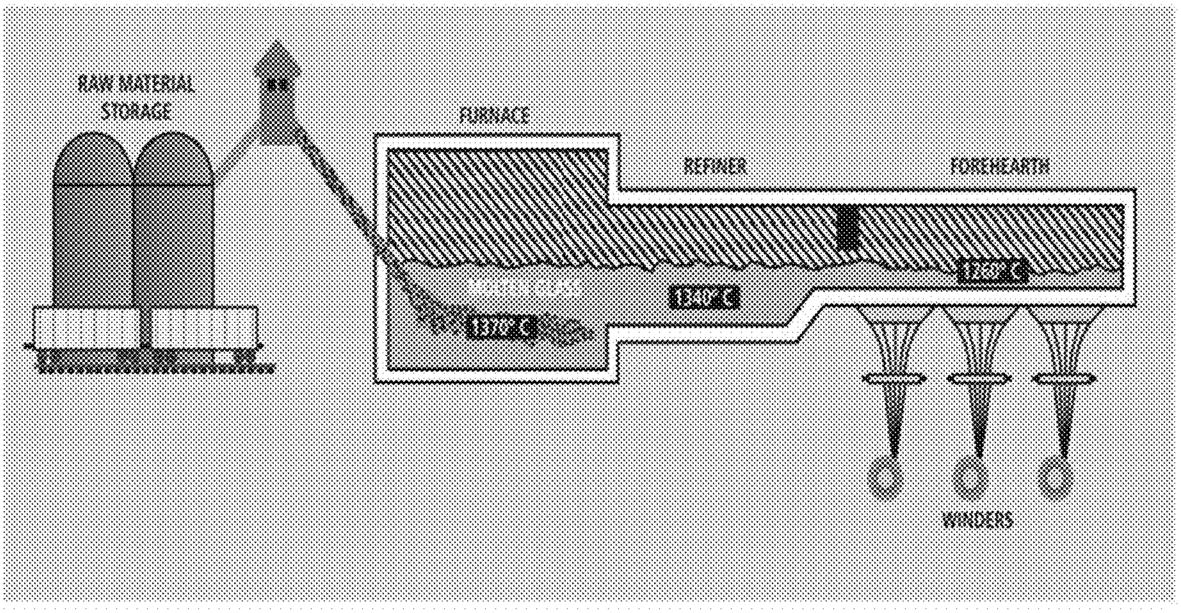
FIG. 4 shows the manufacturing process of glass fibre.
Figure 5:
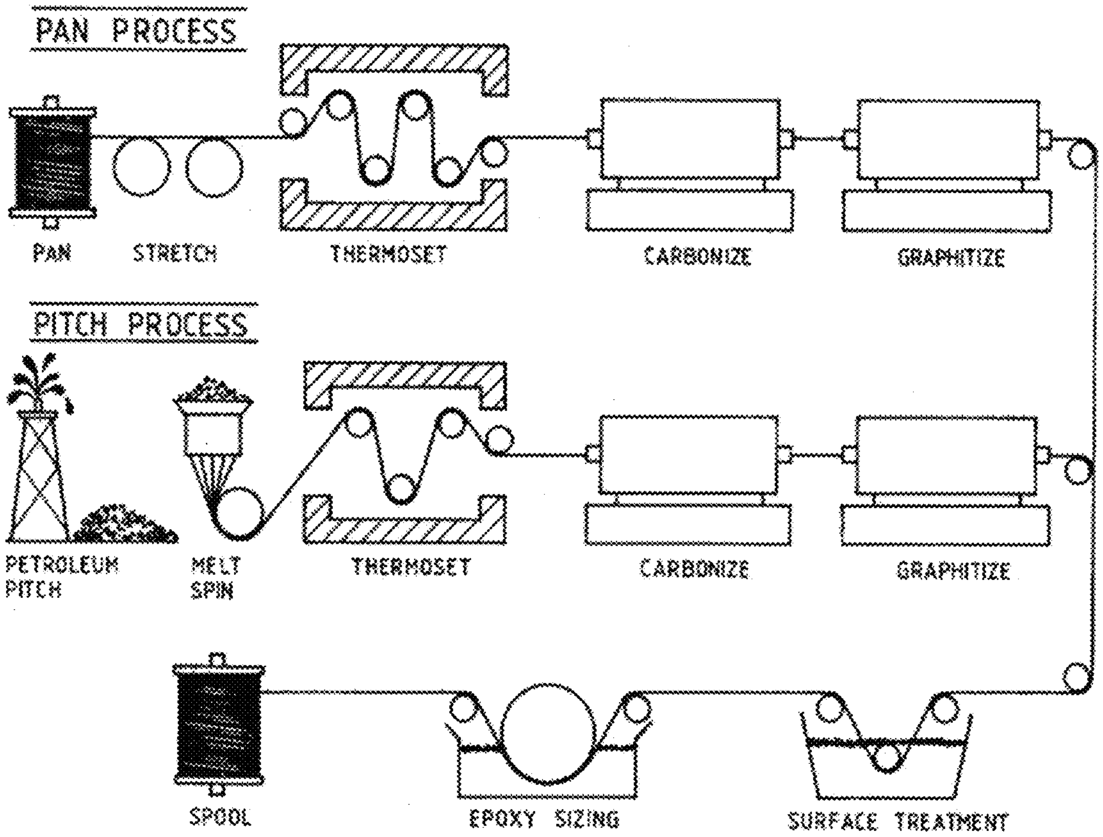
FIG. 5 shows carbon and graphite being added into precursors for carbon fibres, such as polyacryonitrile (PAN), rayon and pitch.

Various ratios of graphite to glaze were tested to determine the overall resistance. The results can be seen in FIG. 3. From this data it can be seen that the amount of graphite can affect the overall resistance in carrier, and judicious selection of the amount of graphite in conjunction with the carbon can enable formulation of compositions of the invention.

Example 4

Preparation/Method

Three plywood boards were painted with one coat of Sample 4A, 4B or 4C as described in the following table, each applied at the same thickness using t32 mesh over a rectangular area measuring 190 mm×210 mm. Copper electrodes were applied to each side of the rectangular area in the same position for each sample.

Results

The following resistances were measured across the rectangular sample areas for each of Samples 4A, 4B and 4C. The resin used in each case was an HOPE resin:

| Sample | 4A | 4B | 4C |
|---|---|---|---|
| Resin | RV 15 HDPE WB | RV 15 HDPE WB | RV 15 HDPE WB |
| Resin mass (g) | 80 | 80 | 80 |
| Carbon black | NG 100% Liquid conductive black | NG 100% Liquid conductive black | NG 100% Liquid conductive black |
| Carbon black mass (g) | 10 | 10 | 10 |
| Graphite | 3775-99.9% crystallinity; heat treated to 2500-3000° C. | AF99-99% crystallinity | 325A-85.9% crystallinity |
| Graphite mass (g) | 10 | 10 | 10 |
| Resistance measured across panel (Ω) at 20° C. | 14.8 | 142.8 | 1416.0 |

-continued

| Sample | 4A | 4B | 4C |
|---|---|---|---|
| Resistance measured across panel (Ω) at 40° C. | 14.8 | 140 | 1377.0 |
| Resistance measured across panel (Ω) at 60° C. | 14.7 | 135 | 1330.0 |
| TCR* over range 20-60° C. (/° C.) | −0.00017 | −0.0014 | −0.0015 |

$^{*}TCR_{20\text{-}60^{\circ}\,C.} = [R_{60^{\circ}\,C.}/R_{20^{\circ}\,C.} - 1]/(60^{\circ}\,C. - 20^{\circ}\,C.)$ The crystallinity and heat treatment of graphite in Sample 4A contributes to the thermal stability of the coating and is 10× more conductive than that of the AF99 and 100× more conductive than that of the 325A graphites in Samples 4B and 4C. respectively. This is despite the operating temperature of 20-60° C.

Furthermore, the TCR of Sample 4A is an order of magnitude lower (0.1Ω drop across 20-60° C.) than that of Sample 4B (8.0Ω drop across 20-60° C.) and Sample 4C (47Ω drop across 20-60° C.), an effect also attributed to the crystallinity and heat treatment of graphite in Sample 4A. The substantially lower TCR of Sample 4A is beneficial for applications such as underfloor heating as the resistance of the composition hardly changes with variations in operating temperatures of 20-60° C., resulting in electrical stability over extended time periods and the tendency to avoid thermal “run away”. Furthermore, heat output of coatings with TCRs closer to zero are easier to control and show minimal variation in their day-to-day electrical conductivity and heat generation, which is particularly useful in domestic settings where coatings are likely to be repeatedly heated and cooled and/or used over an extended period of time. Even small efficiencies in electrical stability are important as the cost savings are cumulative over time, and especially for heating applications that are run for days, weeks, months, and even years at a time. The coatings of the invention provide such efficiencies and are a significant improvement over the prior art.

While the invention has been described with reference to preferred embodiments, those skilled in the art will understand that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Also, all citations referred herein are expressly incorporated herein by reference. The following examples show how the present invention can be practiced. They should be construed as illustrative of the invention and not a limitation of it.

The invention claimed is:

1. An electrothermic composition comprising:

a first conductive carbon component selected from the group consisting of: conventional thermal blacks, furnace blacks, lamp blacks, channel blacks, surface-modified carbon blacks, surface functionalised carbon blacks, and heat-treated carbons;

a second resistor component which is graphite having a crystallinity of 99.9% and wherein the graphite is heat treated at a temperature of 2500° C. to 3000° C.; and a binder;

whereby the composition has a thermal coefficient of electrical resistance (TCR) of ±0.0001 to 0.0010 per ° C. over a temperature range of from about 20° C. to 60° C. in an airborne environment, wherein the ratio of the first conductive component and the second resistor component is selected between 10:1 to 1:10.

2. A composition according to claim 1 wherein the binder has a Tg below 0° C.

3. A composition according to claim 1 wherein the first conductive carbon component is produced by a process at a temperature of least 1000° C.

4. A composition according to claim 1 wherein the first conductive carbon component has a shape selected from the group consisting of flake-like, spherical-like, needle-like, plate-like, wire-like, tube-like, whisker-like, ball-like, single-wall, double-wall, multi-wall carbon nano tubes, buckyballs, quantum dots, and combinations thereof.

5. A composition according to claim 1 wherein the average particle size of the first conductive carbon component is in the range of between about 10 nm to 50 nm.

6. A composition according to claim 1 wherein the first conductive carbon component is included in the composition in a concentration of between 1 and 40% wt of the total weight of the composition.

7. A composition according to claim 1 wherein the first conductive carbon component has a surface area of between 200 and 2000 $m^2/g$.

8. A composition according to claim 1 wherein the graphite has a particle size in the range of between about 250 nm to 500 μm.

9. A composition according to claim 1 wherein the graphite is present in the composition in a concentration of between 1 and 40% wt of the total weight of the composition.

10. A composition according to claim 1 wherein the graphite has a surface area of from about 25 to about 500 $m^2/g$.

11. A composition according to claim 1 wherein the graphite is selected from the group consisting of: calcined petroleum coke, crystalline flake graphite, flake graphite, expandable graphite, purified flake graphite, purified crystalline flake graphite, purified petroleum coke, purified synthetic graphite, purified-vein graphite, synthetic graphite, and vein graphite.

12. A composition according to claim 1 wherein the graphite has a shape selected from the group consisting of flake-like, spherical-like, needle-like, plate-like, wire-like, tube-like, whisker-like, ball-like, nano graphites, tubes, wires, and combinations thereof.

13. A composition according to claim 1 wherein the graphite has a particle size between 1-40 micron.

14. A composition according to claim 1 wherein the thermal conductivity in the horizontal direction of the graphite is between 100 to 2000 W/m·K, or wherein the thermal conductivity in the vertical direction of the graphite is between 1 to 100 W/m·K.

15. A composition according to claim 1 wherein the surface area of the graphite is 1% to 80% less than the surface area of the first conductive carbon component.

16. A composition according to claim 1 wherein the binder is a resinous binder, comprising 1 to 90% by volume or weight of the composition and is selected from the group consisting of: organic, inorganic, natural, synthetic, animal, vegetable, or mineral, aqueous, solvent, thermoplastic, thermosetting, rigid, flexible binder systems and combinations thereof.

17. A composition according to claim 16 wherein the binder is selected from the group consisting of acrylics, alkyds, carbon fibre, cellulosics, epoxies, fluoro-plastics, ionomers, natural rubber, nylons, phenolics, polyamides, polybutadienes, polyesters, polyamides, polypropylenes, polyurethanes, silicone resins, and silicone rubbers, styrene-butadiene, nitrile rubbers, polysulphide rubbers, vinyl-ethyelene, and polyvinyl acetates.

18. A composition according to claim 1 wherein the composition is devoid of metal or metal oxide.

19. A method for generating heat on a floor, wall, or calling, the method comprising the steps of:

(a) providing a composition according to claim 1;

(b) attaching electrodes to said composition or a material formed from the composition;

(c) connecting said electrodes to a source of electricity; and (d) energizing said source of electricity, thereby generating heat at a temperature of between 10 and 60° C. from said composition or a material formed from the composition.

20. The method of claim 19, wherein the electricity has a voltage of less than 50 V.

* * * * *